United States Patent
Takahashi et al.

(10) Patent No.: US 8,316,639 B2
(45) Date of Patent: *Nov. 27, 2012

(54) INTERNAL COMBUSTION ENGINE, VEHICLE, MARINE VESSEL, AND EXHAUST GAS CLEANING METHOD FOR INTERNAL COMBUSTION ENGINE

(75) Inventors: Yusuke Takahashi, Shizuoka (JP); Tsugunori Konakawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 308 days.

This patent is subject to a terminal disclaimer.

(21) Appl. No.: 12/669,810

(22) PCT Filed: Jun. 15, 2009

(86) PCT No.: PCT/JP2009/060855
§ 371 (c)(1),
(2), (4) Date: Jan. 20, 2010

(87) PCT Pub. No.: WO2009/151137
PCT Pub. Date: Dec. 17, 2009

(65) Prior Publication Data
US 2010/0192553 A1 Aug. 5, 2010

(30) Foreign Application Priority Data
Jun. 13, 2008 (JP) .................................. 2008-155070
Jul. 22, 2008 (JP) .................................. 2008-188428

(51) Int. Cl.
*F01N 1/02* (2006.01)
*F01N 1/08* (2006.01)
*F01N 3/00* (2006.01)
*F01N 3/02* (2006.01)
*F01B 27/02* (2006.01)

(52) U.S. Cl. ................. 60/299; 60/311; 60/312; 60/313; 60/314; 60/274; 181/250; 181/266; 181/273; 181/276

(58) Field of Classification Search ............ 60/311–314, 60/273, 289, 285, 274; 181/250, 266, 273, 181/276

See application file for complete search history.

(56) References Cited

U.S. PATENT DOCUMENTS 2,297,046 A * 9/1942 Bourne ........................ 181/250
(Continued)

FOREIGN PATENT DOCUMENTS

JP 61-155620 A 7/1986
(Continued)

OTHER PUBLICATIONS

JP1-76520U Applicant Admitted Prior Art co-pending U.S. Appl. No. 12/669,808.*

(Continued)

*Primary Examiner* — Thomas Denion
*Assistant Examiner* — Anthony Ayala Delgado
(74) *Attorney, Agent, or Firm* — Keating & Bennett, LLP

(57) ABSTRACT

An internal combustion engine capable of improving cleaning efficiency by preventing an increase in the temperature of the exhaust gas to lessen the deterioration of the catalyst. The internal combustion engine includes a convergent section, a divergent section, and a branch section. The branch section branches a shock wave, propagating in a downstream direction at a higher velocity than exhaust gas flowing into an exhaust path from a combustion chamber when an exhaust valve is opened, from a portion of the exhaust path which is upstream with respect to the divergent section, and propagates the shock wave back to the exhaust path. The exhaust gas is caused to pass the convergent section and to collide against the shock wave between the branch section and the divergent section, so as to increase the pressure of the exhaust gas in the convergent section. Such exhaust gas is caused to pass the divergent section to generate a new shock wave and to decrease the temperature of the exhaust gas. A catalyst of an exhaust cleaning device is provided in a portion of the exhaust path which is downstream with respect to the divergent section.

17 Claims, 18 Drawing Sheets

U.S. PATENT DOCUMENTS

| | | | |
|---|---|---|---|
| 3,116,596 A * | 1/1964 | Voris et al. | 60/307 |
| 3,254,484 A * | 6/1966 | Kopper | 60/275 |
| 3,563,030 A * | 2/1971 | Lentz et al. | 60/288 |
| 3,655,011 A * | 4/1972 | Willett | 181/228 |
| 4,094,284 A * | 6/1978 | Gesell | 123/444 |
| 4,501,341 A | 2/1985 | Jones | |
| 4,660,378 A | 4/1987 | Scharpf | |
| 4,690,245 A | 9/1987 | Gregorich et al. | |
| 5,425,232 A | 6/1995 | Holtermann | |
| 5,732,555 A * | 3/1998 | Gracyalny et al. | 60/299 |
| 6,568,359 B2 * | 5/2003 | Pischinger et al. | 123/90.11 |
| 2004/0031643 A1 | 2/2004 | Wagner et al. | |
| 2008/0022671 A1 * | 1/2008 | Konakawa et al. | 60/313 |
| 2008/0093162 A1 * | 4/2008 | Marocco et al. | 181/250 |

FOREIGN PATENT DOCUMENTS

| | | |
|---|---|---|
| JP | 61-212629 A | 9/1986 |
| JP | 07-205890 A | 8/1995 |
| JP | 2004-150310 A | 5/2004 |
| JP | 2008-031868 A | 2/2008 |
| WO | 01/21941 A1 | 3/2001 |

OTHER PUBLICATIONS

Official Communication issued in International Patent Application No. PCT/JP2009/060855, mailed on Sep. 15, 2009.

Takahashi et al.; "Internal Combustion Engine, Vehicle, Marine Vessel, and Exhausting Method for Internal Combustion Engine"; U.S. Appl. No. 12/669,808; filed Jan. 20, 2010.

Takahashi et al.; "Internal Combustion Engine, Vehicle, Marine Vessel, and Secondary Air Supply Method for Internal Combustion Engine"; U.S. Appl. No. 12/669,809; filed Jan. 20, 2010.

Takahashi et al.; "Multi-Cylinder Internal Combustion Engine, Vehicle, Marine Vessel, and Exhausting Method for Multi-Cylinder Internal Combustion Engine"; U.S. Appl No. 12/669,811; filed Jan. 20, 2010.

* cited by examiner

INTERNAL COMBUSTION ENGINE, VEHICLE, MARINE VESSEL, AND EXHAUST GAS CLEANING METHOD FOR INTERNAL COMBUSTION ENGINE

BACKGROUND OF THE INVENTION

1. Field of the Invention

The present invention relates to an internal combustion engine, a vehicle, a marine vessel, and an exhaust gas cleaning method for an internal combustion engine.

2. Description of the Related Art

Conventionally, internal combustion engines including a three-way catalyst for cleaning exhaust gas as proposed in Japanese Laid-Open Patent Publication No. 07-205890 are known.

In order to maximize the cleaning efficiency of the three-way catalyst, the air/fuel ratio of the mixed gas (hereinafter, referred to as the "combustion air/fuel ratio") needs to be the theoretical air/fuel ratio. However, when the internal combustion engine is driven at the theoretical air/fuel ratio in a high load state, the combustion temperature becomes excessively high, and also the temperature of the exhaust gas becomes high. When the temperature of the exhaust gas becomes excessively high, the catalyst is exposed to an excessively high temperature and is deteriorated due to the phenomenon of so-called sintering. As a result, the cleaning efficiency of the catalyst is decreased. For this reason, in order to avoid the temperature of the exhaust gas from becoming excessively high, the internal combustion engine as proposed in Japanese Laid-Open Patent Publication No. 07-205890 is driven at an air/fuel ratio smaller than the theoretical air/fuel ratio when in a high load state. Therefore, the cleaning performance of the three-way catalyst cannot be utilized to the maximum possible degree.

SUMMARY OF THE INVENTION

In view of such circumstances, preferred embodiments of the present invention provide an internal combustion engine capable of improving the cleaning efficiency by preventing the temperature of the exhaust gas from increasing so as to lessen the deterioration of the catalyst.

The present inventors discovered a shock wave propagating in a downstream direction in an exhaust path when the exhaust port is opened, and conceived of a novel concept that by using a negative pressure generated behind the shock wave, air can be supplied even when the internal combustion engine is in a high load state. However, this shock wave is generated in the vicinity of the exhaust port. Thus, the present inventors conceived of decreasing the temperature of the exhaust gas by supplying a large amount of air to the vicinity of the exhaust port. However, it was discovered that as a result of this, the pumping loss is increased and so the internal combustion engine output is decreased.

The present inventors conceived of an idea of generating a new negative pressure by generating a new shock wave in the exhaust path, which is different from the shock wave propagating in the downstream direction in the exhaust path when the exhaust port is opened, and thus decreasing the pressure and temperature in the exhaust path, in other words, decreasing the pressure and temperature of the exhaust gas. This novel method applies the principle of the generally known convergent-divergent nozzle, generally called "de Laval nozzle", to an internal combustion engine including a secondary air supply system. This nozzle includes a convergent section including a flow path cross-sectional area which is decreased as a fluid progresses, a divergent section provided downstream with respect to the convergent section and including a flow path cross-sectional area which is increased as the fluid progresses, and a throat section provided between the convergent section and the divergent section. When the pressure ratio of the pressure P0 in the convergent section and the pressure P in the divergent section (i.e., P/P0) is smaller than the critical pressure ratio (for the air, about 0.528), the velocity of the fluid exceeds the sonic velocity in the divergent section. In order to generate a new shock wave in the exhaust path, the present inventors provided a convergent section including a smaller flow path cross-sectional area at a downstream end thereof than at an upstream end thereof and also provided a divergent section, downstream with respect to the convergent section, having a larger flow path cross-sectional area at a downstream end thereof than at an upstream end thereof. However, where merely the convergent section and the divergent section are provided in the exhaust path, the pressure ratio of the pressure P0 in the convergent section and the pressure P in the divergent section (i.e., P/P0) do not reach the critical pressure ratio and so it was impossible to generate a new shock wave.

As a result of further active studies on the internal combustion engines, the present inventors discovered that the shock wave propagating in the downstream direction in the exhaust path when the exhaust port is opened propagates at a higher velocity than the exhaust gas flowing at that time into the exhaust path from the combustion chamber. By paying attention to the difference in the velocity between the shock wave and the exhaust gas, the present inventors conceived of a structure for increasing the pressure P0 in the convergent section. This is a structure that includes a branch section arranged to branch the shock wave preceding the exhaust gas and thus propagating the shock wave back to the exhaust path. Then, the present inventors conceived of a structure by which the branch section is combined with a catalyst provided in a portion of the exhaust path which is downstream with respect to the divergent section.

An internal combustion engine according to a preferred embodiment of the present invention includes a combustion chamber including an exhaust port; an exhaust valve arranged to open or close the exhaust port; an exhaust device including an exhaust path arranged to guide exhaust gas discharged from the combustion chamber via the exhaust port; and an exhaust cleaning device provided in the exhaust path and including a catalyst. The exhaust device preferably includes a convergent section having a flow path cross-sectional area smaller at a downstream end thereof than at an upstream end thereof; a divergent section provided downstream with respect to the convergent section and including a flow path cross-sectional area larger at a downstream end thereof than at an upstream end thereof; and a branch section arranged to branch a shock wave, propagating in a downstream direction in the exhaust path at a higher velocity than the exhaust gas flowing into the exhaust path from the combustion chamber when the exhaust port is opened, from a portion of the exhaust path which is upstream with respect to the divergent section, and propagate the shock wave back to the exhaust path. The exhaust gas flowing into the exhaust path from the combustion chamber is caused to pass the convergent section and to collide against the shock wave which has propagated in the branch section, between the branch section and the divergent section, thus to increase the pressure of the exhaust gas in the convergent section. The exhaust gas is caused to pass the divergent section to generate a new shock wave and thus to decrease the temperature of the exhaust gas. The catalyst of the exhaust cleaning device is provided in a portion of the exhaust path which is downstream with respect to the divergent section.

Another internal combustion engine according to a preferred embodiment of the present invention includes a combustion chamber including an exhaust port; an exhaust valve arranged to open or close the exhaust port; an exhaust device including an exhaust path arranged to guide exhaust gas discharged from the combustion chamber via the exhaust port; and an exhaust cleaning device provided in the exhaust path and including a catalyst. The exhaust device preferably includes a convergent section having a flow path cross-sectional area smaller at a downstream end thereof than at an upstream end thereof; a divergent section provided downstream with respect to the convergent section and including a flow path cross-sectional area larger at a downstream end thereof than at an upstream end thereof; and a branch section arranged to branch a shock wave, propagating in a downstream direction in the exhaust path at a higher velocity than the exhaust gas flowing into the exhaust path from the combustion chamber when the exhaust port is opened, from a portion of the exhaust path which is upstream with respect to the divergent section, and to propagate the shock wave back to the exhaust path. The catalyst of the exhaust cleaning device is provided in a portion of the exhaust path which is downstream with respect to the divergent section. Where the velocity of the exhaust gas discharged from the combustion chamber when the exhaust port is opened is Ve and the propagation velocity of the shock wave propagating in the exhaust path is Vs, the distance Le between the exhaust port and an entrance of the branch section and the distance Ls by which the shock wave propagates in the branch section fulfill the relationship of Le/Ve≦(Le+2Ls)/Vs; and where the time from when the exhaust port is opened until the exhaust port is closed is tv, the distance Ld between the entrance of the branch section and the divergent section fulfills the relationship of (Le+2Ls+Ld)/Vs≦tv+(Le+Ld)/Ve.

An exhaust gas cleaning method for an internal combustion engine according to a preferred embodiment of the present invention comprises the steps of combusting fuel in a combustion chamber; opening an exhaust valve arranged to open or close an exhaust port of the combustion chamber to discharge exhaust gas from the combustion chamber to an exhaust path and to generate a shock wave propagating in the exhaust path at a higher velocity than the exhaust gas; branching at least a portion of the shock wave from the exhaust path and propagating the branched shock wave back to the exhaust path to cause the shock wave to collide against the exhaust gas, thereby increasing the pressure of the exhaust gas; causing the exhaust gas to flow into a portion of the exhaust path having a smaller flow path cross-sectional area in a downstream section thereof than in an upstream section thereof, thereby increasing the pressure of the exhaust gas; causing the exhaust gas to flow into a portion of the exhaust path having a larger flow path cross-sectional area in a downstream section thereof than in an upstream section thereof, thereby generating a new shock wave propagating in a downstream direction in the exhaust path and thus decreasing the temperature of the exhaust gas; and causing the exhaust gas to pass the catalyst to clean the exhaust gas.

According to preferred embodiments of the present invention, the shock wave preceding the exhaust gas is delayed in the branch section and propagated back to the exhaust path and is also caused to collide against the exhaust gas progressing with a delay. This increases the pressure of the exhaust gas. The exhaust gas is caused to pass the convergent section, which increases the pressure of the exhaust gas in the convergent section. Since such exhaust gas is caused to pass the divergent section, a new shock wave, which is different from the shock wave generated when the exhaust port is opened, is generated, and the temperature of the exhaust gas is decreased. Using this arrangement, the temperature of the exhaust gas flowing into the catalyst can be decreased. As a result, the cleaning efficiency can be improved with less deterioration of the catalyst.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 4A-4C are cross-sectional views of the exhaust path and the like showing the progress of a shock wave and exhaust gas; wherein FIG. 4A shows an initial state of an exhaust stroke, FIG. 4B shows a state where the shock wave propagates to a branch path, and FIG. 4C shows a state where the shock wave reflected by the branch path collides against the exhaust gas.

FIGS. 9A and 9B are P-V diagrams representing the pumping loss; wherein FIG. 9A shows a P-V diagram of a conventional internal combustion engine, and FIG. 9B shows a P-V diagram of an internal combustion engine according to a preferred embodiment of the present invention.

DETAILED DESCRIPTION OF THE PREFERRED EMBODIMENTS

As a result of active studies, the present inventors conceived of a novel idea that the pressure and temperature in the exhaust path can be significantly decreased by applying the principle of the convergent-divergent nozzle and using the following method not conventionally known. The present inventors discovered that this novel method can improve the performance of an internal combustion engine.

The novel method is as follows. (1) A shock wave preceding the exhaust gas is branched; (2) The branched shock wave is delayed such that the shock wave collides against the exhaust gas, thereby increasing the pressure of the exhaust gas; (3) The exhaust gas having the increased pressure is caused to pass the divergent section to be accelerated to an ultrasonic velocity, thereby generating a shock wave; and (4) The pressure and temperature in the exhaust path are significantly decreased.

Preferred Embodiment 1

Hereinafter, an internal combustion engine according to a preferred embodiment of the present invention will be described in detail with reference to the drawings. In the following description, the terms "upstream" and "downstream" respectively refer to upstream and downstream with respect to the direction in which exhaust gas flows.

Figure 1:
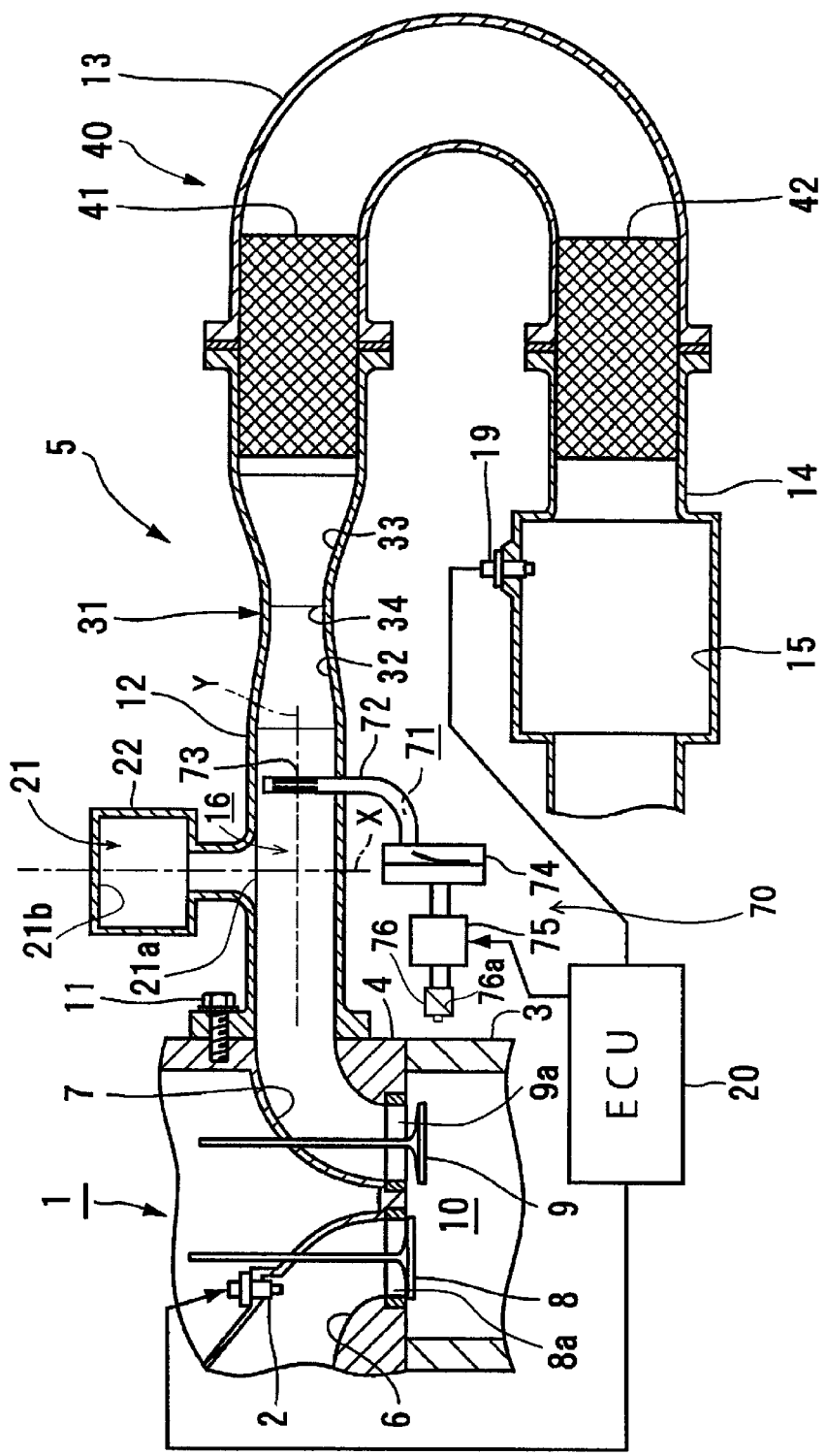
FIG. 1 shows a structure of an exhaust device of an internal combustion engine according to Preferred Embodiment 1, and is a cross-sectional view of an exhaust path and the like thereof.

As shown in FIG. 1, an internal combustion engine 1 includes a cylinder body 3 and a cylinder head 4 provided at one end thereof. In the cylinder body 3 and the cylinder head 4, a combustion chamber 10 is provided. The engine 1 is preferably a four-cycle gasoline internal combustion engine, for example. The internal combustion engine 1 is preferably a single-cylinder engine, for example. The internal combustion engine 1 may be of an air-cooled type or of a water-cooled type, for example. The cylinder head 4 includes a downstream section 6 of an intake path and an upstream section 7 of an exhaust path 16 provided therein. The cylinder head 4 accommodates an intake valve 8 arranged to open or close an intake port 8a, an exhaust valve 9 arranged to open or close an exhaust port 9a, a valve driving mechanism (not shown) arranged to drive the intake valve 8 and the exhaust valve 9, and the like. In this preferred embodiment, one downstream section 6 of the intake path and one upstream section 7 of the exhaust path 16 are preferably provided for one combustion chamber 10. Alternatively, a plurality of intake ports 8a, a plurality of intake valves 8, a plurality of exhaust ports 9a, and/or a plurality of exhaust valves 9 may be provided for one combustion chamber, for example. An injector 2 arranged to inject fuel is attached to the cylinder head 4. Although not shown, the cylinder 4 is also provided with an ignition plug.

Upstream with respect to the downstream section 6 of the intake path, an upstream section of the intake path (not shown) is connected. Inside the upstream section, a throttle valve is located. The throttle valve is operable manually or electronically controllable by a motor.

An exhaust device 5 includes the cylinder head 4, a first exhaust pipe 12 connected to the cylinder head 4, a second exhaust pipe 13 connected to the first exhaust pipe 12, and a third exhaust pipe 14 connected to the second exhaust pipe 13. The first exhaust pipe 12 is attached to the cylinder head 4 preferably via a bolt 11, for example. The third exhaust pipe 14 includes an exhaust chamber 15 provided therein. The exhaust device 5 has the exhaust path 16 provided therein, which communicates the upstream section 7 to the outside via the exhaust chamber 15.

As shown in FIG. 1, a cleaning device 40 in this preferred embodiment includes a first catalyst 41 and a second catalyst 42. The first catalyst 41 and the second catalyst 42 are provided in the exhaust path 16. The second catalyst 42 is located downstream with respect to the first catalyst 41. The first catalyst 41 and the second catalyst 42 have a space therebetween.

A muffler (not shown) is connected downstream with respect to the exhaust chamber 15. Exhaust gas which flows into the inside of the exhaust chamber 15 passes the muffler and then is discharged outside. The exhaust chamber 15 is provided with an oxygen concentration sensor 19 arranged to detect an amount of oxygen in the exhaust gas.

An ECU 20, which is a control device, controls the amount of fuel to be injected from the injector 2, the time to cause the ignition plug to ignite or the like, based on the rotational speed of the internal combustion engine 1, the opening angle of the throttle valve, or a signal detected by the oxygen concentration sensor 19. In this preferred embodiment, the ECU 20 controls the amount of fuel to be injected from the injector 2 such that, for example, the air/fuel ratio of the mixed gas to be absorbed into the internal combustion engine 1 is the theoretical air/fuel ratio.

In an upstream section of the first exhaust pipe 12, a branch pipe 22 is provided. One end of the branch pipe 22 is connected to the first exhaust pipe 12, and the other end of the branch pipe 22 is closed. The closed end of the branch pipe 22 acts as a reflecting section 21b so as to reflect a shock wave described later. The branch pipe 22 is preferably integrally formed with the first exhaust pipe 12, for example. Alternatively, the branch pipe 22 may be formed separately from, and fixed to, the first exhaust pipe 12. For example, the first exhaust pipe 12 and the branch pipe 22 may be welded together or fixed to each other via a tightening member (not shown) such as a bolt, a rivet or the like, for example. The branch pipe 22 preferably has larger flow path cross-sectional area at the other end thereof than at the one end thereof, but the shape of the branch pipe 22 is not limited to that shown in FIG. 1. The flow path cross-sectional area of the branch pipe 22 at the other end may be the same as, or smaller than, the flow path cross-sectional area at the one end. Inside the branch pipe 22, a branch section 21 is preferably provided. One end of the branch section 21 is communicated to the exhaust path 16, and the other end thereof is closed. An entrance 21a of the branch section 21 (i.e., the portion communicated to the exhaust path 16) includes a flow path cross-sectional area that is configured to allow the shock wave propagating in the exhaust path 16 to also propagate in the branch section 21, as described later. In the figure, "X" represents the center line of the flow path cross-section of the entrance 21a of the branch section 21.

Between the branch section 21 and the first catalyst 41, a convergent-divergent nozzle 31 is provided. The convergent-divergent nozzle 31 is generally called a "de Laval nozzle". The convergent-divergent nozzle 31 accelerates the velocity of the exhaust gas flowing in the exhaust path 16 from a subsonic velocity to an ultrasonic velocity. The convergent-divergent nozzle 31 preferably includes a convergent section 32, a throat section 34 and a divergent section 33. The convergent section 32 is a portion having a flow path cross-sectional area which gradually decreases toward a downstream end thereof. The divergent section 33 is a portion having a flow path cross-sectional area which gradually increases toward a downstream end thereof. The throat section 34 is a portion provided between the convergent section 32 and the divergent section 33 and having the smallest flow path cross-sectional area.

A secondary air supply system 70 arranged to supply air to the exhaust path 16 of the exhaust device 5 is provided. The secondary air supply system 70 includes an air cleaner 76 including a filter 76a, an air amount control valve 75 provided downstream with respect thereto to control an amount of air, a lead valve 74 provided downstream with respect thereto, and a secondary air supply pipe 72 provided downstream with respect thereto. The secondary air supply pipe 72 is connected between the branch pipe 22 and the convergent-divergent nozzle 31 in the first exhaust pipe 12. A leading end of the secondary air supply pipe 72 is exposed to the exhaust path 16. The secondary air supply system 70 defines a secondary air supply path 71 extending from the inside space of the air cleaner 76 to the exhaust path. A supply section 73 of the secondary air supply path 71 preferably has a slit-shaped configuration at the leading end of the secondary air supply pipe 72. As a result of this structure, the secondary air supply pipe 72 can supply air to a wide region of the exhaust path 16 including the center line Y of the flow path cross-section thereof.

An upstream end of the secondary air supply pipe 72 is connected to the air cleaner 76 via the lead valve 74 and the air amount control valve 75. The lead valve 74 prevents the exhaust gas from flowing from the secondary air supply pipe 72 to a portion upstream with respect to the lead valve 74. The lead valve 74 is arranged to be opened by a negative pressure generated in the exhaust path 16 to cause the air to flow toward the supply section 73 of the secondary air supply path 71. The air amount control valve 75 is arranged to control and adjust the amount of the air to the driving state of the internal combustion engine 1. The air amount control valve 75 includes an actuator, a servo motor, a solenoid or the like driven by a negative intake pressure or the like. The opening angle of the air amount control valve 75 is controlled by the ECU 20.

When the opening angle of the throttle valve is smaller than a prescribed angle, the ECU 20 causes the air amount control valve 75 to close or relatively decreases the opening angle of the throttle valve. The prescribed angle is preset and stored in the ECU 20. When the opening angle of the throttle valve is larger than the prescribed angle, the ECU 20 increases the opening angle of the air amount control valve 75. As seen from this, the opening angle of the air amount control valve 75 is increased or decreased in accordance with the opening angle of the throttle valve. The provision of the air amount control valve 75 allows the secondary air to be supplied to the exhaust path 16 at an appropriate flow rate with no excessiveness or shortage. The air amount control valve 75 is not absolutely necessary and may be omitted.

Figure 2:
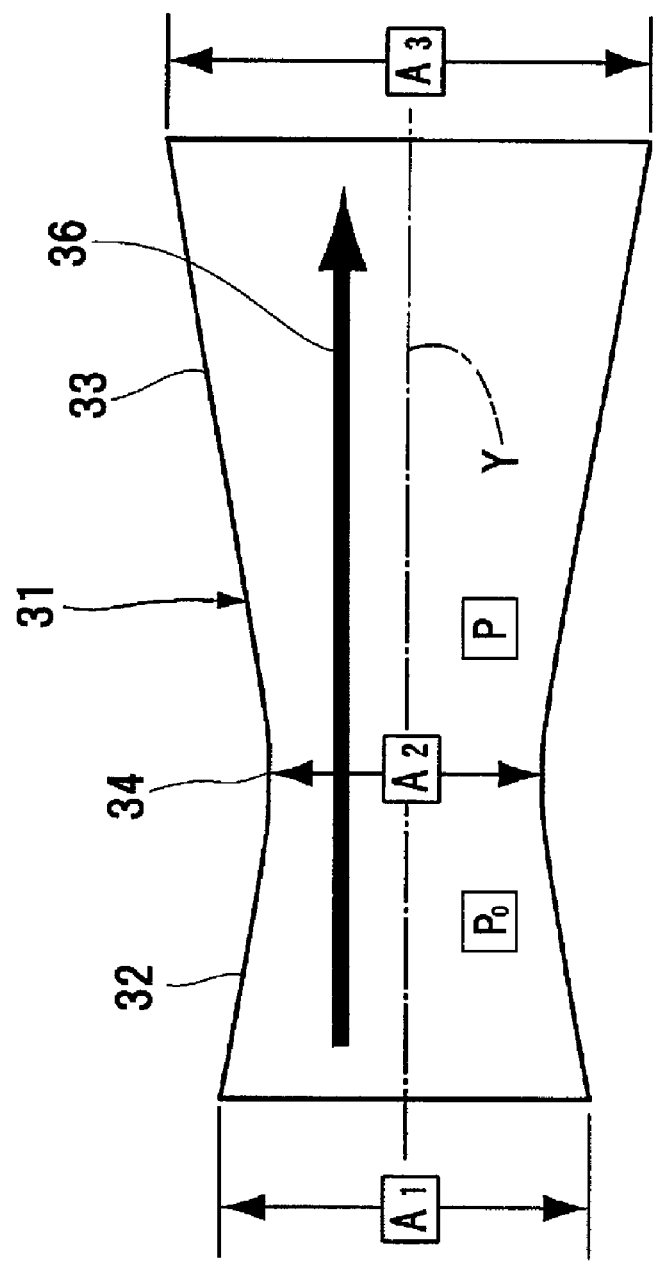
FIG. 2 is a schematic sectional view of a convergent-divergent nozzle.

FIG. 2 is a schematic view of a general convergent-divergent nozzle. As shown in FIG. 2, flow path cross-sectional area A1 at an upstream end of the convergent section 32, flow path cross-sectional area A2 of the throat section 34, and flow path cross-sectional area A3 at the downstream end of the divergent section 33 have the relationships of A1>A2 and A2<A3. Flow path cross-sectional area A2 of the throat section 34 is the same as flow path cross-sectional area A2 at the downstream end of the convergent section 32 and the flow path cross-sectional area at an upstream end of the divergent section 33. In this preferred embodiment shown in FIG. 1, each of the flow path cross-sectional areas of the convergent section 32 and the divergent section 33 changes at a constant rate in the flow direction. There is no specific limitation on the shape of the convergent section 32 and the divergent section 33. The convergent section 32 and the divergent section 33 may be formed to have a shape that includes a flow path cross-sectional area changing step by step like a nozzle adopted for rockets, or may be formed to include a smoothly curved shape.

The convergent-divergent nozzle 31 is formed to fulfill the conditions represented by expressions (1) and (2) below. By the velocity of the exhaust gas flowing into the throat section 34 reaching Mach 1 (i.e., the sonic velocity), the exhaust gas in the divergent section 33 can be accelerated to an ultrasonic velocity.

Expression 1

$$\frac{dM}{dx} = \frac{\Lambda}{1-M^2} \qquad (1)$$

Expression 2

$$\Lambda \equiv M\left[1 + \frac{\gamma-1}{2}M^2\right]\left[\frac{\gamma M^2}{2}\left(\frac{4f}{D}\right) - \frac{1}{A}\frac{dA}{dx}\right] \qquad (2)$$

Among these expressions, expression (1) represents the relationship between the shape of the exhaust pipe and the Mach number in a primary flow accompanied by viscous friction. Expression (2) represents $\Lambda$ in expression (1). In these expressions, M represents the Mach number, A represents the cross-sectional area of the exhaust pipe at an arbitrary cross-section, D represents the diameter of the pipe at the arbitrary cross-section, $\gamma$ represents the specific heat ratio, x represents the distance in the flow direction, and f represents the frictional coefficient.

Figure 3:
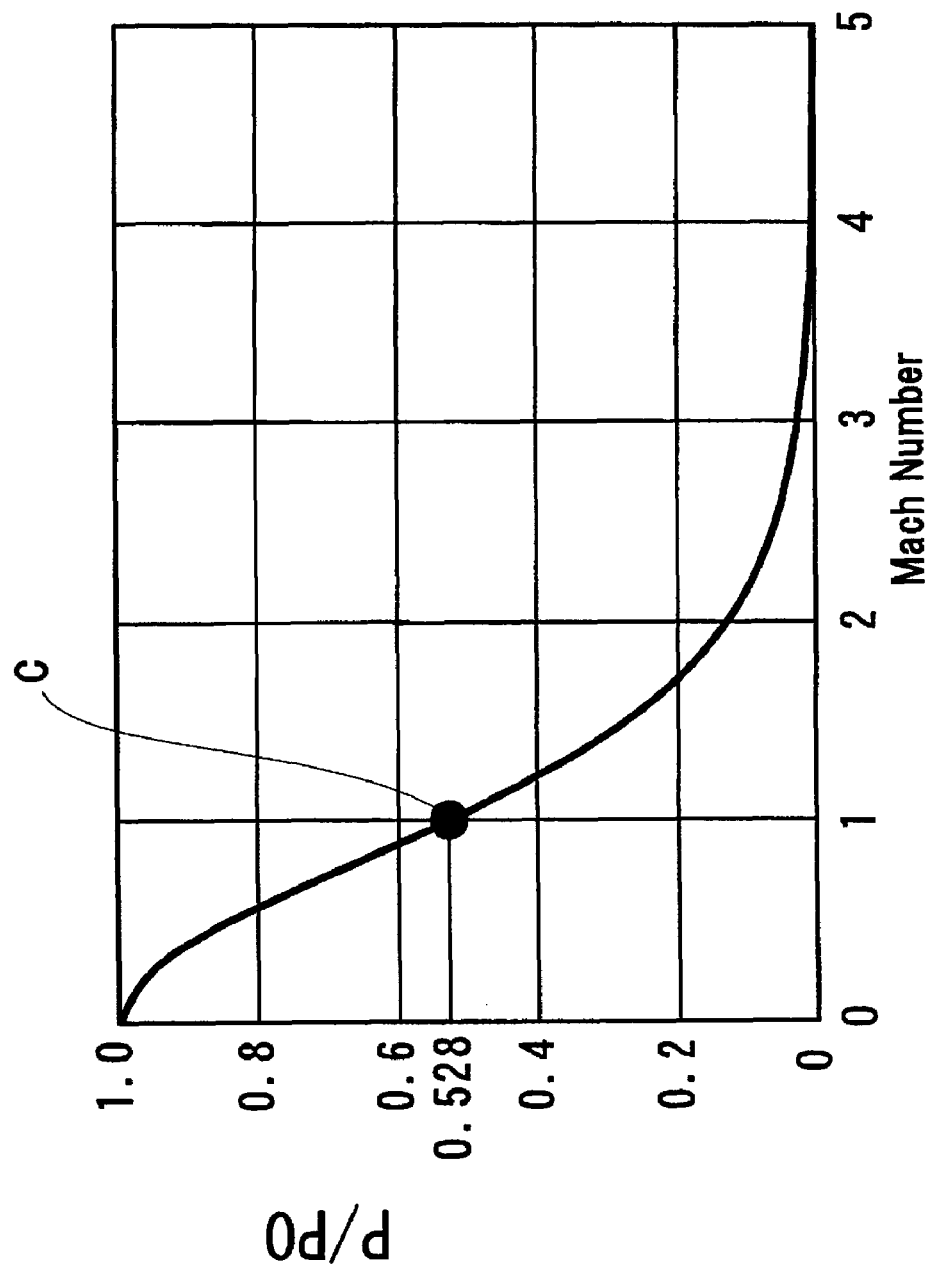
FIG. 3 shows the relationship between the pressure ratio and the Mach number in the convergent-divergent nozzle.

As shown in FIG. 2 and FIG. 3, generally with the convergent-divergent nozzle 31 configured to fulfill the conditions represented by expressions (1) and (2), when the pressure ratio of the full pressure P0 in a portion upstream with respect to the throat section 34 and the static pressure P in a portion downstream with respect to the throat section 34, i.e., P/P0, is smaller than the critical pressure ratio (=0.528; point C in FIG. 3), the velocity becomes the sonic velocity (Mach 1) in the throat section and becomes an ultrasonic velocity in the divergent section 33. When the full pressure P0 is increased in order to make P/P0 smaller than the critical pressure ratio, an ultrasonic flow can be formed in the convergent-divergent nozzle 31.

Figure 6:
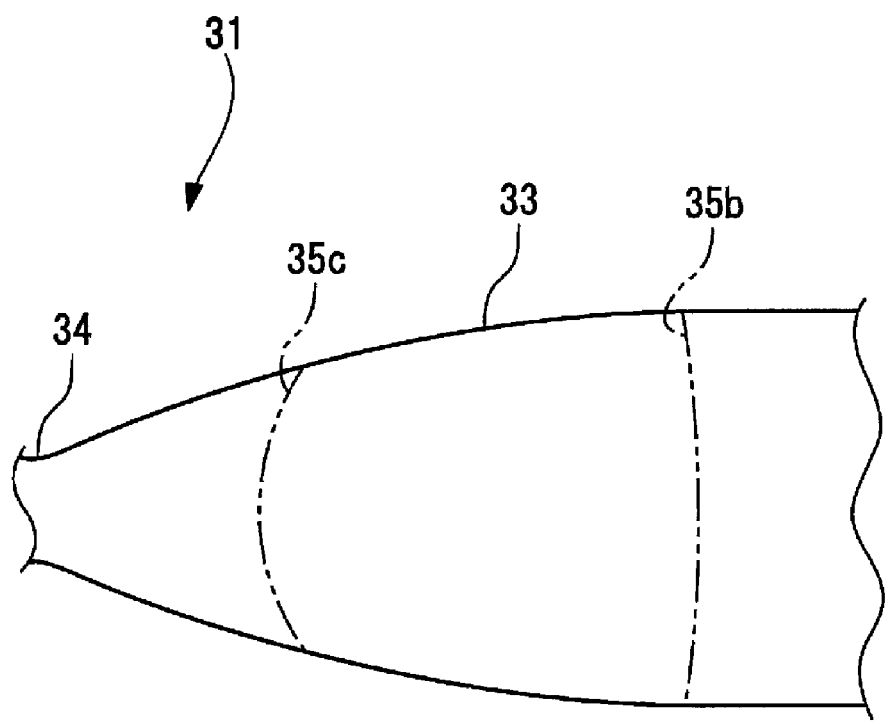
FIG. 6 is a schematic view drawn based on a photograph of an inside of the convergent-divergent nozzle taken by the Schlieren method.

When the velocity becomes an ultrasonic velocity in the convergent-divergent nozzle 31, a new shock wave 35b propagating in a downstream direction in the divergent section 33 and an expansion wave 35c propagating in an upstream direction in the divergent section 33 are generated (see FIG. 6). Therefore, the fluid in a space between the shock wave 35b progressing in the downstream direction in the exhaust path 16 and the expansion wave 35c progressing in the upstream direction in the exhaust path 16 expands rapidly, and so the pressure of the exhaust gas flowing in the exhaust path 16 is decreased. As a result, the temperature of the exhaust gas can be rapidly decreased by an adiabatic cooling effect caused by adiabatic expansion. As a result of active studies, the present inventors have realized such a state by combining the convergent-divergent nozzle 31 and the branch section 21.

Figure 4:
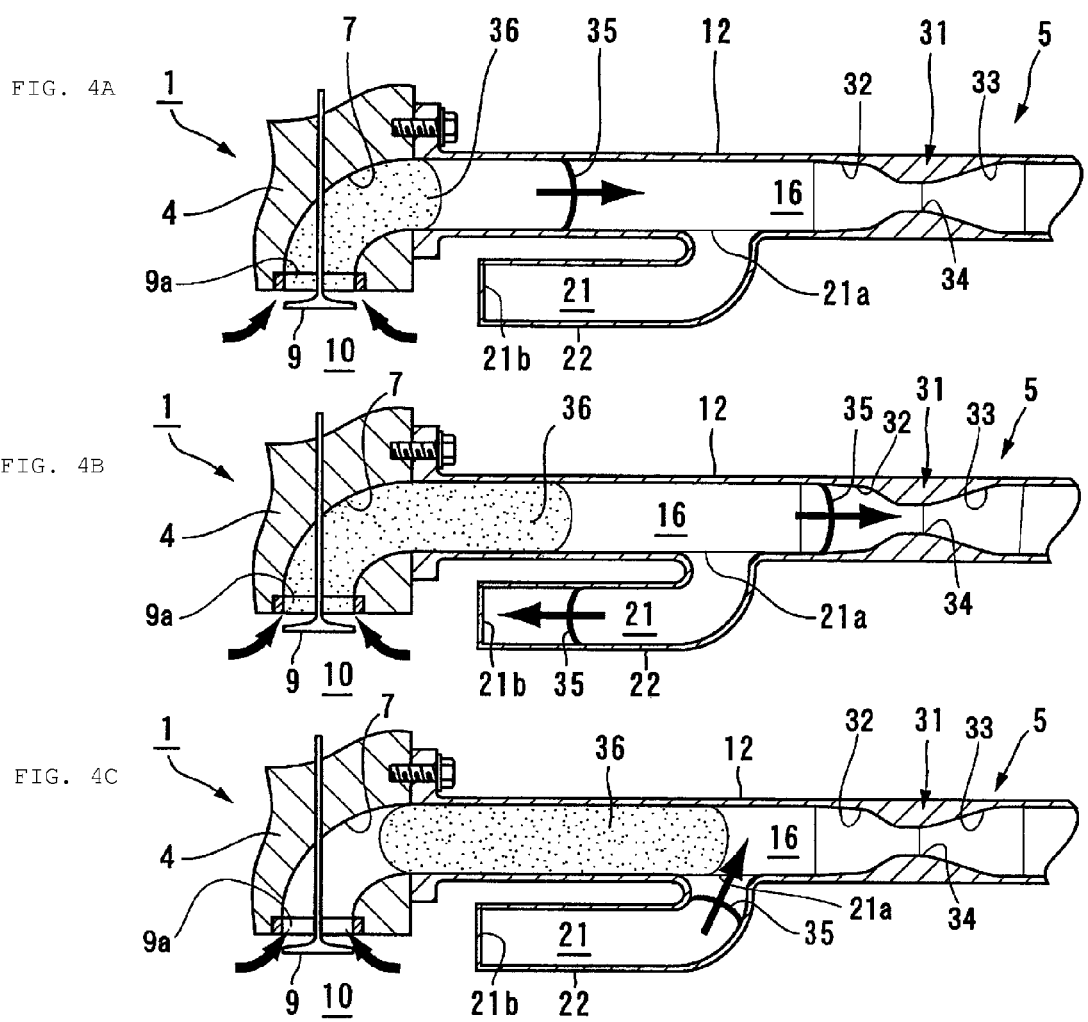

Now, with reference to FIGS. 4A through 4C, the principle by which the exhaust gas is put into a low pressure and low temperature state in the exhaust path 16 will be described. FIGS. 4A through 4C schematically show the exhaust device 5. In FIGS. 4A through 4C, identical or equivalent elements to those in FIG. 1 or FIG. 2 bear identical reference numerals assigned thereto.

As shown in FIG. 4A, when the exhaust port 9a is opened in an exhaust stroke of the internal combustion engine 1, the exhaust gas 36 of a high pressure is injected from the combustion chamber 10 into the upstream section 7 of the exhaust path 16 via the exhaust port 9a. At the time when the exhaust port 9a starts opening, the pressure difference between the combustion chamber 10 and the upstream section 7 of the exhaust path 16 is large. Therefore, the velocity of the exhaust gas 36 becomes the sonic velocity and so a shock wave 35 is generated in the upstream section of the exhaust path 16. As the opening angle of the exhaust port 9s increases, the amount of the exhaust gas 36 flowing into the upstream section 7 of the exhaust path 16 increases but the velocity of the exhaust gas 36 decreases. The velocity of the exhaust gas also decreases as the exhaust gas progresses in the upstream section 7 of the exhaust path 16. As shown in FIG. 4A, the shock wave 35 propagates to the inside of the first exhaust pipe 12 from the upstream section 7 of the exhaust path 16 and further propagates in the downstream direction at a high velocity. Meanwhile, the exhaust gas 36 progresses in the downstream direction in the exhaust path 16 with a delay with respect to the shock wave 35 at a relatively low velocity.

As shown in FIG. 4B, the shock wave 35 progressing inside the first exhaust pipe 12 is separated into a shock wave propagating in the exhaust path 16 and a shock wave propagating in the branch section 21 at the entrance 21a of the branch section 21, and then these shock waves progress separately in the exhaust path 16 and the branch section 21. The shock wave 35 progressing in the exhaust path 16 is attenuated and disappears after passing the convergent-divergent nozzle 31. By contrast, the shock wave 35 progressing in the branch section 21 is reflected by the reflecting section 21b of the branch section 21 and progresses oppositely in the branch section 21 to return to the exhaust path 16.

As shown in FIG. 4C, the length of the branch section 21 is set such that the time when the reflected shock wave 35 returns to the exhaust path 16 from the branch section 21 is the same as, or after, the time when the exhaust gas 36 of a high pressure reaches the center of the entrance 21a of the branch section 21. Therefore, the shock wave 35 and the exhaust gas 36 collide against each other at a position of the exhaust path which is upstream with respect to the divergent section 33 and is the same as, or downstream with respect to, the branch section 21.

Figure 5:
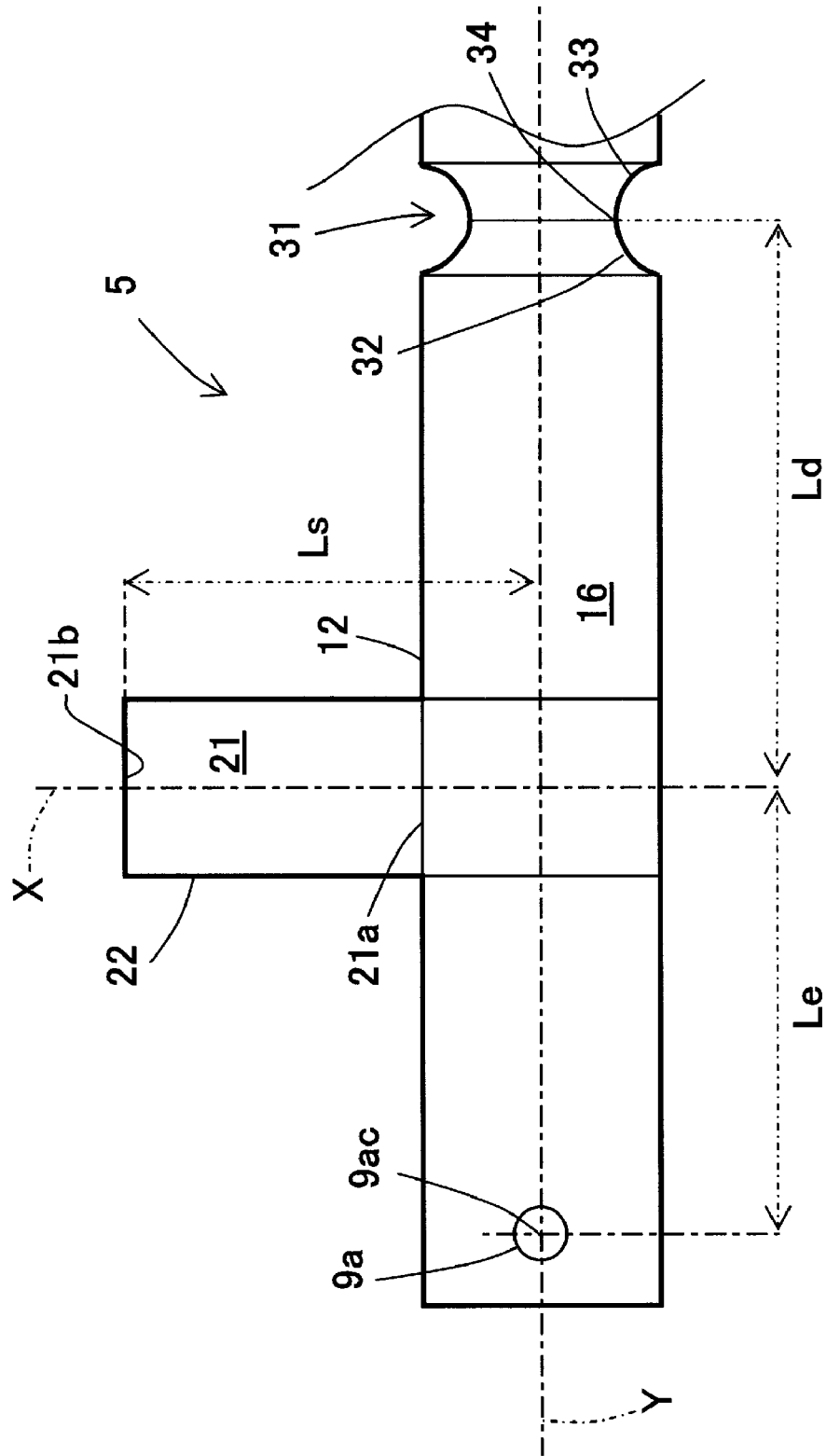
FIG. 5 is a schematic view of the exhaust path and the like, showing a route in the exhaust path in which the shock wave progresses and a route in the exhaust path in which the exhaust gas progresses.

As shown in FIG. 5, the distance from center 9ac of the exhaust port 9a to center line X of the flow path cross-section of the entrance 21a of the branch section 21 is set as Le, and the distance from center line Y of the flow path cross-section of the exhaust path 16 to the reflecting section 21b is set as Ls. The velocity of the exhaust gas 36 is set as Ve, and the propagation velocity of the shock wave 35 is set as Vs. In this case, time $T_1$, which is from when the exhaust port 9a is opened until the exhaust gas 36 reaches the entrance 21a, is represented by expression (3). Time $T_2$, which is from when the exhaust port 9a is opened until the shock wave 35 is reflected by the reflecting section 21b and reaches the center line Y of the exhaust path 16, is represented by expression (4).

$$T_1 = Le/Ve \tag{3}$$

$$T_2 = (Le + 2Ls)/Vs \tag{4}$$

When $T_1 \leq T_2$, the reflected shock wave 35 and the exhaust gas 36 collide against each other. Specifically, when $Le/Ve \leq (Le+2Ls)/Vs$, the reflected shock wave 35 and the exhaust gas 36 collide against each other at a position of the exhaust path which is upstream with respect to the divergent section 33 and is the same as, or downstream with respect to, the branch section 21. For the sake of convenience, for example, the maximum velocity of the exhaust gas 36 may be regarded as the velocity Ve, or the average velocity of the exhaust gas 36 may be regarded as the velocity Ve. Similarly, for example, the maximum propagation velocity of the shock wave 35 may be regarded as the propagation velocity Vs, or the average propagation velocity of the shock wave 35 may be regarded as the propagation velocity Vs.

As shown in FIG. 5, the distance from the center line X of the flow path cross-section of the entrance 21a of the branch section 21 to the upstream end of the divergent section 33 is set as Ld, and the time from when the exhaust port 9a is opened until the exhaust port 9a is closed is set as tv. Time $T_3$, which is from when the exhaust port 9a is opened until a trailing end of the exhaust gas 36 reaches the upstream end of the divergent section 33, is represented by expression (5). Time $T_4$, which is from when the exhaust port 9a is opened until the shock wave 35 is reflected by the reflecting section 21b and reaches the upstream end of the divergent section 33, is represented by expression (6).

$$T_3 = tv(Le+Ld)/Ve \tag{5}$$

$$T_4 = (Le+2Ls+Ld)/Vs \tag{6}$$

When $T_4 \leq T_3$, the reflected shock wave 35 and the exhaust gas 36 can be caused to collide against each other before the entirety of the exhaust gas 36 passes the throat section 34. Specifically, when $(Le+2Ls+Ld)/Vs \leq tv+(Le+Ld)/Ve$, the reflected shock wave 35 and the exhaust gas 36 can be caused to collide against each other before the entirety of the exhaust gas 36 passes the throat section 34.

In the case where the distance Ls between the center line Y of the flow path cross-section of the exhaust path 16 and the reflecting section 21b is relatively short, the attenuation of the shock wave 35 in the branch section 21 is suppressed. For example, the distance Ls may be shorter than the distance Le.

The pressure of the exhaust gas 36 in the convergent section 32 is further increased by the exhaust gas 36 being compressed in the convergent section 32 and also by the exhaust gas 36 colliding against the shock wave 35. When this occurs, the full pressure P0 upstream with respect to an entrance of the convergent-divergent nozzle 31 is increased. Thus, the ratio of the full pressure P0 upstream with respect to the entrance and the static pressure P downstream with respect to the throat section, i.e., P/P0, becomes smaller than the critical pressure ratio of about 0.528. As a result, the velocity of the exhaust gas 36 reaches the sonic velocity in the throat section 34.

FIG. 6 is a schematic view drawn based on a photograph of an inside of the convergent-divergent nozzle taken by the Schlieren method. By the velocity of the exhaust gas 36 reaching the sonic velocity, a new shock wave is generated in the convergent-divergent nozzle 31. Hereinafter, the newly generated shock wave will be referred to as the "progressing shock wave 35b" for the sake of convenience. The progressing shock wave 35b is accelerated when passing the divergent section 33 of the convergent-divergent nozzle 31. As shown in FIG. 6, when the progressing shock wave 35b is generated, an expansion wave 35c progressing oppositely to the progressing shock wave 35b is generated. By the progressing shock wave 35b being accelerated in the divergent section 33 and by the expansion wave 35c progressing oppositely to the progressing shock wave 35b, the pressure and temperature of the exhaust gas 36 present between the progressing shock wave 35b and the expansion wave 35c are significantly decreased. As described later, the pressure of the exhaust gas becomes equal to or lower than the atmospheric pressure, namely, a negative pressure.

Figure 7:
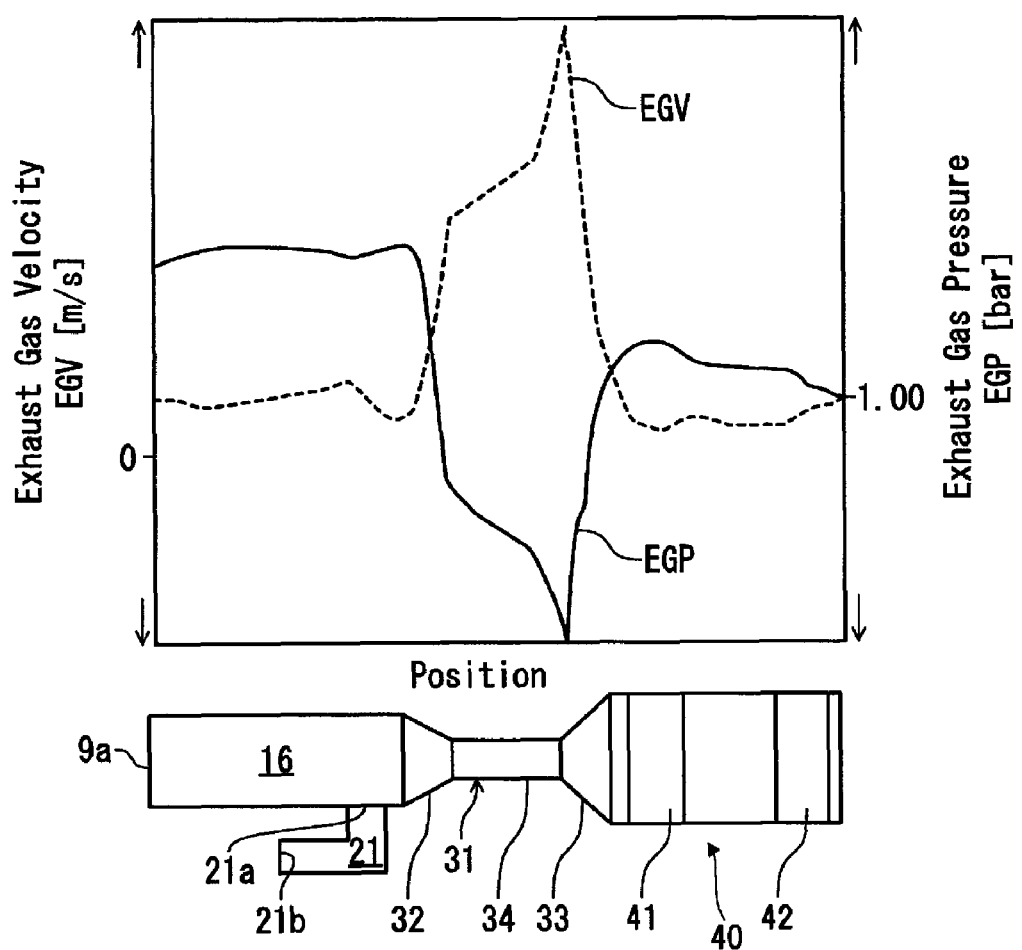
FIG. 7 is a graph showing the relationship between the exhaust gas velocity and the exhaust gas pressure at prescribed positions in a first exhaust pipe.
Figure 8:
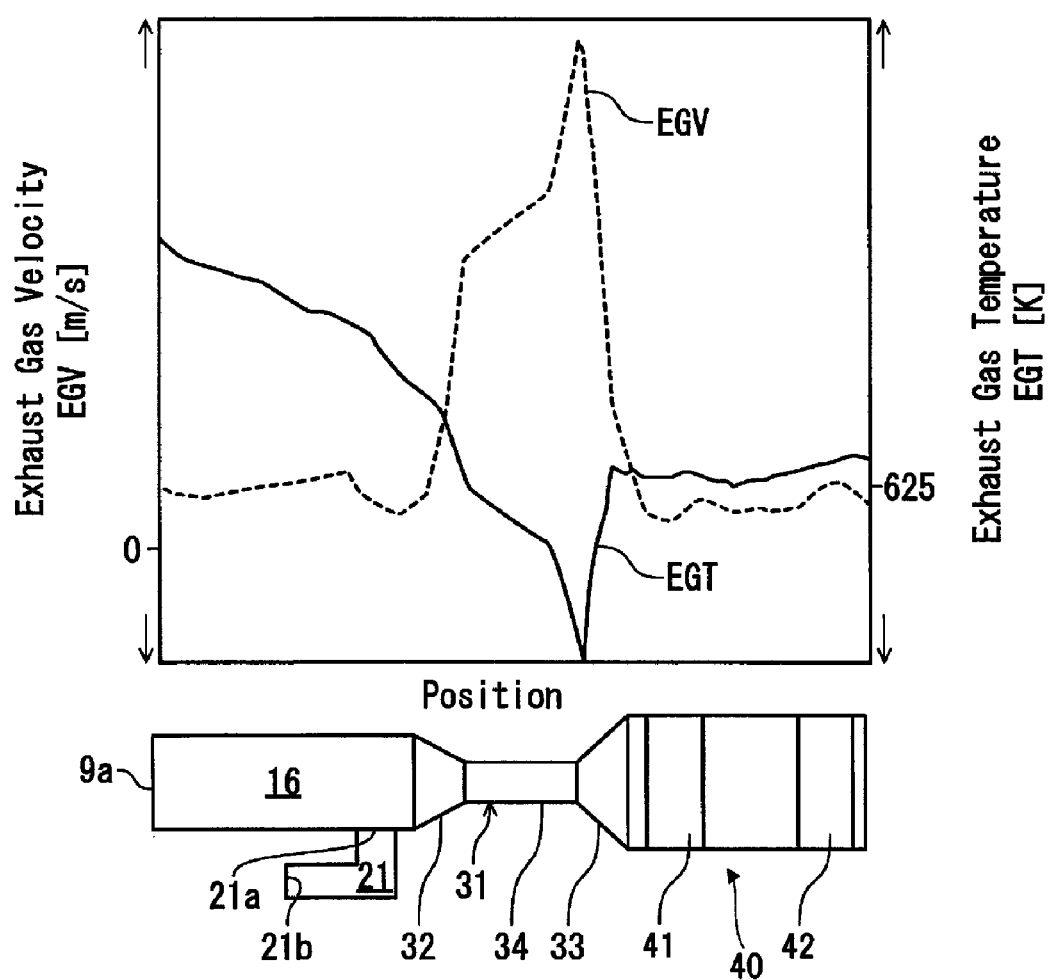
FIG. 8 is a graph showing the relationship between the exhaust gas velocity and the exhaust gas temperature at the prescribed positions in the first exhaust pipe.

FIG. 7 and FIG. 8 show the results of simulations performed by the present inventors. FIG. 7 shows the exhaust gas velocity and the exhaust gas pressure at points in the exhaust path 16 immediately after the new shock wave 35b is generated in the convergent-divergent nozzle 31. FIG. 8 shows the exhaust gas velocity and the exhaust gas temperature at the points in the exhaust path 16 immediately after the new shock wave 35b is generated in the convergent-divergent nozzle 31. After the shock wave 35b is generated in the convergent-divergent nozzle 31, the shock wave 35b is accelerated in the divergent section 33. When this occurs, as shown in FIG. 7 and FIG. 8, the velocity of the exhaust gas is rapidly increased, whereas the pressure and the temperature of the exhaust gas are rapidly decreased. FIG. 7 and FIG. 8 show the velocity of the exhaust gas and do not show the propagation velocity of the shock wave. In FIG. 7 and FIG. 8, the throat section 34 of the convergent-divergent nozzle 31 preferably is relatively long. After the shock wave 35 reflected by the branch section 21 collides against the exhaust gas 36, the shock wave 35 propagates in the throat section 34 preceding the exhaust gas 36. At this point, adiabatic expansion is generated in the space between the exhaust gas 36 and the shock wave 35a and thus the pressure is decreased. Therefore, the exhaust gas 36 is sucked by the shock wave 35 to flow in the throat section 34, without decreasing in the velocity. Therefore, by setting the length of the throat section 34 having a constant flow path cross-sectional area in accordance with the internal combustion engine, the timing at which the shock wave 35b is to be accelerated in the divergent section 33, in other words, the timing at which the pressure and temperature of the exhaust gas are to be decreased, can be set in accordance with the internal combustion engine.

As described above, the internal combustion engine 1 according to this preferred embodiment can significantly decrease the pressure and temperature of the exhaust gas in the exhaust path 16 as compared with the conventional art.

According to this preferred embodiment, the air can be efficiently supplied into the exhaust path 16 by a negative pressure generated in the exhaust path 16. The negative pressure is significantly higher than, namely, the pressure is s'ignificantly lower than, that in a general internal combustion engine which does not include the convergent-divergent nozzle 31 or the branch pipe 22. The phenomenon that a negative pressure is generated by the action of the convergent-divergent nozzle 31 continues even when the rotational speed of the internal combustion engine 1 increases to be higher than the rotational speed at the time of the maximum output. Therefore, in this preferred embodiment, even when the rotational speed range of the internal combustion engine 1 is in a relatively high range, a sufficient amount of air can be supplied. The "relatively high rotational speed range of the internal combustion engine 1" means a high velocity driving range or a high load driving range in which the above-mentioned general internal combustion engine cannot absorb air. Therefore, in this preferred embodiment, a sufficient amount of air can be supplied to the exhaust path 16 without using a separate device for forcibly supplying the air into the exhaust path 16, such as an air pump or the like. Because a negative pressure is used, the loss of the internal combustion engine output can be small. Even when a pump for supplying air is used, the load on the pump can be small and so the loss of the internal combustion engine output can be small.

In this preferred embodiment, the temperature of the exhaust gas 36 in the exhaust path 16 can be decreased upstream with respect to the first catalyst 41. Therefore, the temperature of the first catalyst 41 and the second catalyst 42 can be prevented from increasing excessively. In the case where the first catalyst 41 and the second catalyst 42 are a three way catalyst, when the temperature is excessively high, the phenomenon called "sintering" occurs to lower the cleaning efficiency. However, in this preferred embodiment, occurrence of such sintering can be effectively prevented. For this reason, even when the internal combustion engine is driven at a high rotational speed, the fuel can be combusted at the theoretical air/fuel ratio. Therefore, the exhaust gas 36 can be efficiently cleaned by the first catalyst 41 and the second catalyst 42. In other words, in this preferred embodiment, the exhaust gas cleaning performance, which is one performance of the internal combustion engine 1, can be improved. In this preferred embodiment, two catalysts are preferably arranged in series in the middle of the exhaust path 16, but the present invention is not limited to this. There may be only one catalyst, or three or more catalysts, for example. A plurality of catalysts may be arranged in parallel, for example.

The temperature of the air to be supplied to the exhaust path is roughly equal to the temperature of the outside air, and is significantly lower than that of the exhaust gas. Therefore, in this preferred embodiment, the temperature of the exhaust gas can be further decreased by the air having a relatively low temperature, which is supplied into the exhaust path 16 in a large amount. Also in this preferred embodiment, a large amount of air can be supplied upstream with respect to the first catalyst 41. Therefore, even where the amount of fuel to be injected is increased in order to make the air/fuel ratio of the internal combustion engine 1 smaller than the theoretical air/fuel ratio, exhaust gas containing an equivalent amount of oxygen to where the air/fuel ratio is the theoretical air/fuel ratio can be supplied to the first catalyst 41. Therefore, in this preferred embodiment, the temperature of the exhaust gas can also be decreased by making the air/fuel ratio of the internal combustion engine 1 smaller than the theoretical air/fuel ratio and thus decreasing the combustion temperature. In addition, since the air/fuel ratio is smaller than the theoretical air/fuel ratio, it is possible to cool the elements in the vicinity of the combustion chamber 10 (intake valve 8, exhaust valve 9, valve seat, piston, etc.) with the extra fuel. Thus, the reliability, which is one performance of the internal combustion engine 1, can be improved.

For example, an internal combustion engine in an outboard motor is often used for a long time in such a driving state that the output thereof is at a maximum. When the air/fuel ratio in such a driving state of the internal combustion engine is made the theoretical air/fuel ratio in order to improve the exhaust gas cleaning efficiency of a catalyst, the combustion temperature becomes excessively high. If no countermeasure is taken, the temperature of the first catalyst 41 and the second catalyst 42 may undesirably become excessively high. As one method for decreasing the temperature of the catalysts, it is conceivable to make the combustion air/fuel ratio smaller than the theoretical air/fuel ratio to decrease the combustion temperature. However, when the air/fuel ratio is smaller than the theoretical air/fuel ratio, the cleaning efficiency of the first catalyst 41 and the second catalyst 42 is decreased.

With the exhaust device 5 in this preferred embodiment, a large amount of air is supplied to the exhaust path 16. Therefore, while the cleaning efficiency of the first catalyst 41 and the second catalyst 42 is kept high, the combustion air/fuel ratio can be made smaller than the theoretical air/fuel ratio to decrease the combustion temperature. Specifically, with the exhaust device 5 in this preferred embodiment, the exhaust gas and the air flow into the first catalyst 41 and the second catalyst 42. Therefore, even if the exhaust gas is short of oxygen because of the decrease of the combustion air/fuel ratio, such a shortage of oxygen can be compensated for by the air supplied to the exhaust path 16. For this reason, even though the combustion air/fuel ratio is made smaller than the theoretical air/fuel ratio, the hazardous components in the exhaust gas can be sufficiently cleaned by the first catalyst 41 and the second catalyst 42.

In other words, the exhaust device 5 in this preferred embodiment can make the combustion air/fuel ratio smaller than the theoretical air/fuel ratio to decrease the combustion temperature while keeping a state where clean exhaust gas is discharged. As a result, the occurrence of abnormal combustion such as self-ignition, knocking or the like in the internal combustion engine 1 can be prevented more certainly.

Also in this preferred embodiment, by making the combustion air/fuel ratio smaller than the theoretical air/fuel ratio, the elements in the combustion chamber 10 can be cooled by the heat of vaporization of the fuel. This cools the inside of the combustion chamber 10 with the fuel and can prevent malfunctioning caused by the temperature in the combustion chamber 10 becoming excessively high, namely, breakage of the piston, deterioration of the valve seat or the like. The temperature of the air to be supplied to the exhaust path 16 is roughly equal to the temperature of the outside air, and is significantly lower than that of the exhaust gas. Therefore, in this preferred embodiment, the temperature of the exhaust gas can be further decreased by the air having a relatively low temperature, which has been supplied into the exhaust path 16 in a large amount. This can prevent the occurrence of sintering of the first catalyst 41 and the second catalyst 42 with more certainty.

By the significant decrease of the pressure of the exhaust gas as in this preferred embodiment, the pumping loss of the internal combustion engine 1 can be reduced. This is for the following reason. When the pressure of the exhaust gas in the exhaust path 16 is significantly decreased, the piston (not shown) of the internal combustion engine 1 is pulled toward the exhaust path 16, namely, toward the top dead center, and so the work necessary for driving the piston in the exhaust stroke is reduced. This will be described with reference to FIGS. 9A and 9B.

Figure 9A:
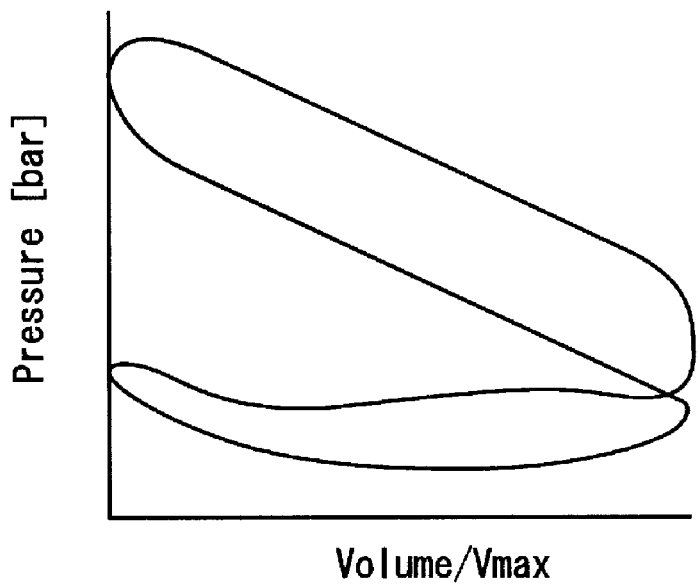
Figure 9B:
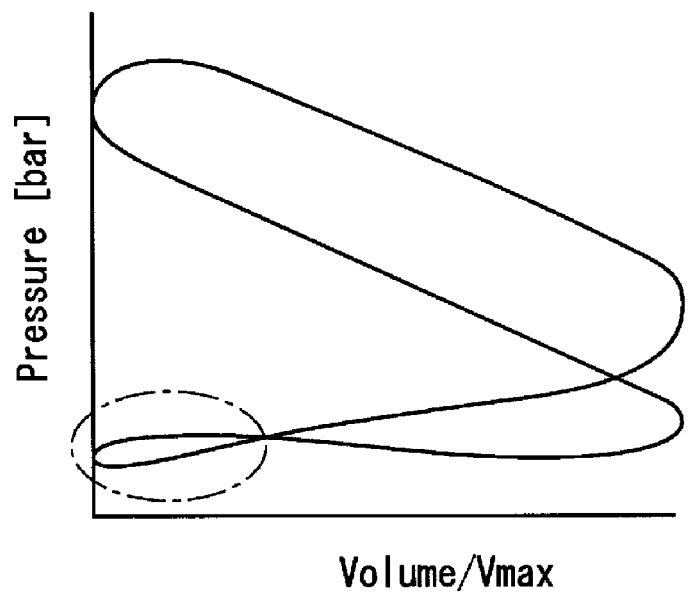

FIG. 9A shows a P-V diagram of a conventional internal combustion engine, and FIG. 9B shows a P-V diagram of the internal combustion engine 1 in this preferred embodiment. As shown in FIG. 9B, when the pressure of the exhaust gas is significantly decreased, the piston is sucked by the exhaust gas even if the crank shaft (not shown) does not drive the piston. Therefore, the internal combustion engine 1 can perform a positive work in the exhaust stroke. The region enclosed by the one-dot chain line represents the positive work.

As shown in FIG. 1, in the exhaust device 5 according to this preferred embodiment, the supply section 73 of the secondary air supply path 71 is located upstream with respect to the upstream end of the divergent section 33. Therefore, the secondary air supply system 70 never obstructs the progressing shock wave 35b. Also as shown in FIG. 1, in the exhaust device 5 according to this preferred embodiment, the supply section 73 of the secondary air supply path 71 is located downstream with respect to the branch section 21. Therefore, the secondary air supply system 70 never obstructs the shock wave 35.

The pressure in the exhaust path 16 decreases at a larger degree at a position closer to the upstream section 7 of the exhaust path 16. For this reason, the supply section 73 of the secondary air supply path 71 may be located at generally the same position as, or upstream with respect to, the branch section 21. This can prevent the expansion wave 35c from being attenuated by the secondary air supply system 70, and thus the air can be supplied more efficiently.

Figure 10:
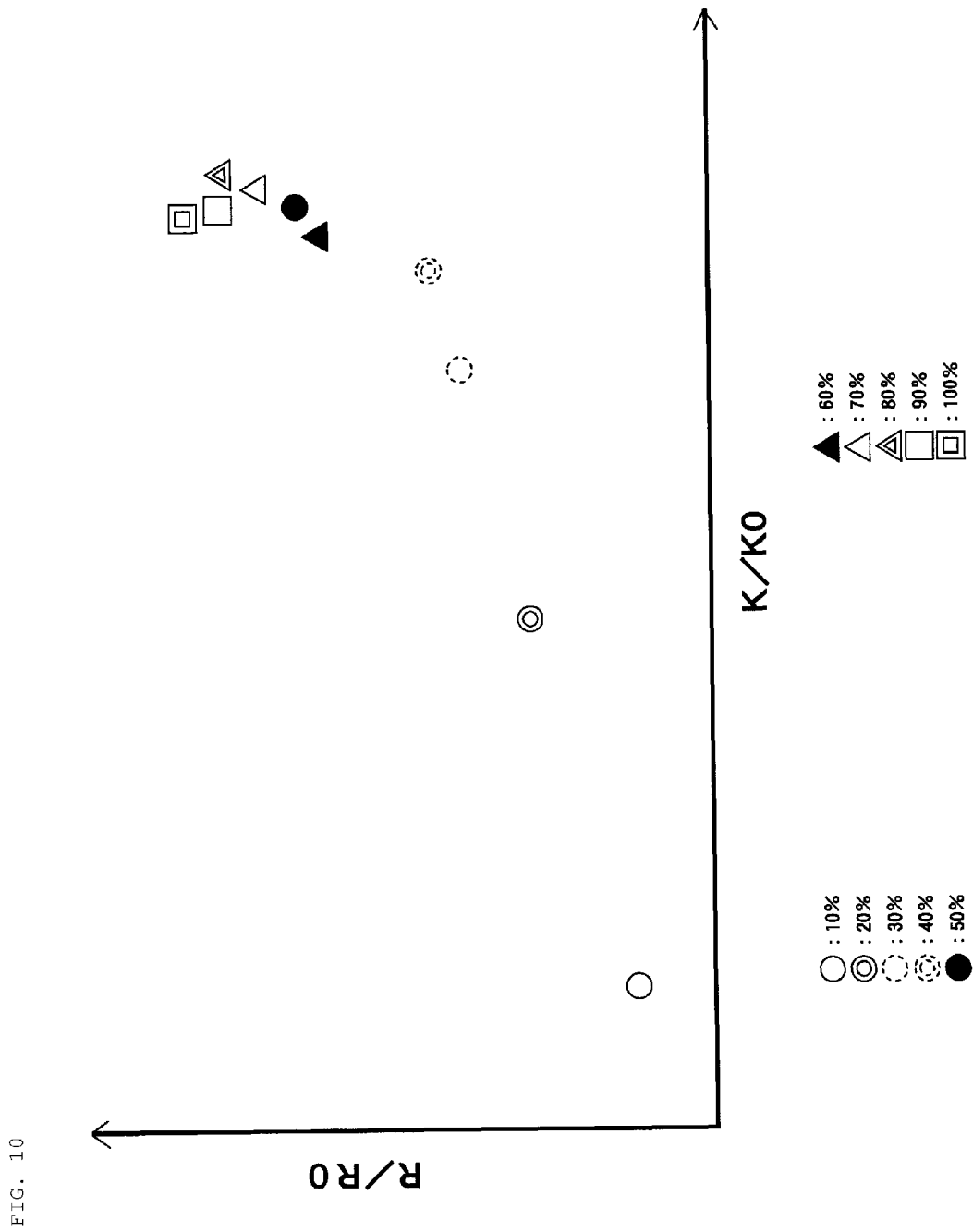
FIG. 10 is a graph showing the relationship between a ratio of the flow path cross-sectional area of a secondary air supply path with respect to the flow path cross-sectional area of the exhaust path, and a ratio of the air/fuel ratio R0 when no secondary air is supplied with respect to the air/fuel ratio R when secondary air is supplied from the secondary air supply path.

FIG. 10 is a graph obtained from a simulation and shows the relationship among three parameters. In the graph of FIG. 10, the vertical axis represents the value obtained by dividing the air/fuel ratio R where the air is supplied from the secondary air supply system 70 by the air/fuel ratio R0 where no air is supplied. When the amount of the supplied air is increased, the value of R/R0 increases. Thus, the vertical axis represents the amount of the supplied air. The horizontal axis represents the value obtained by dividing the pressure K in the convergent section 32 where the branch pipe 22 is provided by the pressure K0 in the convergent section 32 where neither the secondary air supply system 70 nor the branch pipe 22 is provided. When the pressure in the convergent section 32 is increased by the collision of the exhaust gas 36 and the shock wave 35, K/K0 increases. Thus, the horizontal axis represents how the pressure in the convergent section 32 is increased by the collision of the exhaust gas 36 and the shock wave 35. An increase of the value of the horizontal axis means that the critical pressure ratio P/P0 decreases and the progressing shock wave 35b is accelerated in the convergent-divergent nozzle 31. Another parameter is the ratio of the flow path cross-sectional area of the entrance 21a of the branch section 21 with respect to the flow path cross-sectional area of the exhaust path 16 in which the branch section 21 is provided (hereinafter, referred to simply as the "area ratio").

As shown in FIG. 10, when the area ratio is about 10% to about 50%, R/R0 and K/K0 are in proportion to each other. However, when the area ratio is about 50% or higher, R/R0 increases but K/K0 does not increase almost at all. In other words, it is seen that K/K0 can be increased to almost the maximum value by making the area ratio about 50% or higher.

As shown in FIG. 3, when the critical pressure ratio P/P0 is about 0.2 to about 0.8 or when the Mach number is about 0.5 to about 1.7, the critical pressure ratio and the Mach number are proportional to each other. However, as shown in FIG. 3, when the critical pressure ratio is about 0.2 or lower or when the Mach number is about 1.7 or higher, the Mach number rapidly increases as compared with the decrease of the critical pressure ratio. The region in which the Mach number rapidly increases as compared with the decrease of the critical pressure ratio is considered to correspond to the region in which the area ratio is about 50% or higher in FIG. 10. Specifically, it is considered that a shock wave having a Mach number of about 1.7 or higher is generated in the convergent-divergent nozzle 31 by providing the secondary air supply path 71 having an area ratio of about 50% or higher.

Where the area ratio is about 50% or higher, even when the area ratio increases, K/K0 does not increase but R/R0 increases. Specifically, it is seen that even where the area ratio is about 50% or higher, a larger amount of air is supplied as the area ratio is increased. Therefore, the area ratio may be about 100%. Specifically, the flow path cross-sectional area of the exhaust path 16 in which the branch section 21 is provided may be equal to the flow path cross-sectional area of the entrance 21a of the branch section 21. Alternatively, the area ratio may be higher than 100%. Specifically, the flow path cross-sectional area of the entrance 21a of the branch section 21 may be larger than the flow path cross-sectional area of the exhaust path 16 in which the branch section 21 is provided. For example, the entrance 21a of the branch section 21 may have an elliptical cross-sectional area or the like which is larger than the cross-sectional area of the exhaust path 16 in which the branch section 21 is provided.

Preferred Embodiment 2

Figure 11:
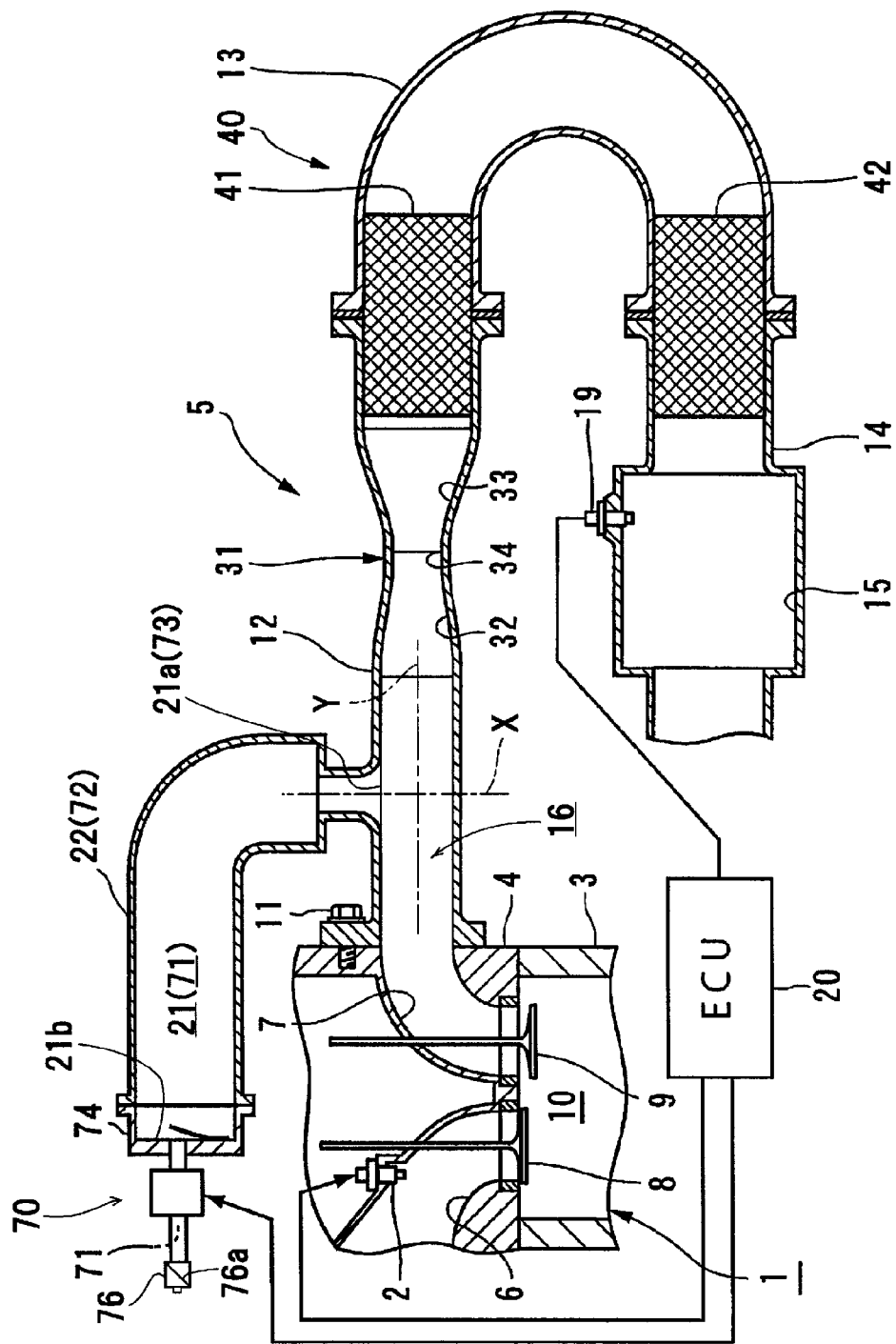
FIG. 11 shows a structure of an internal combustion engine according to Preferred Embodiment 2, and is a cross-sectional view of an exhaust path and the like thereof.

As shown in FIG. 11, in Preferred Embodiment 2, the branch pipe 22 is preferably used as a portion of the secondary air supply pipe. Except for this structural difference, Preferred Embodiment 2 preferably is exactly the same as Preferred Embodiment 1. Accordingly, the detailed description of Preferred Embodiment 2 is provided by the detailed description of FIG. 1 through FIG. 10 relating to Preferred Embodiment 1. The lead valve 74 is attached to the secondary air supply pipe 72 also acting as the branch pipe 22. The lead valve 74 acts as the closed end of the branch pipe 22 also acting as the secondary air supply pipe 72. In other words, the lead valve 74, which is a portion of the secondary air supply system 70, acts as the reflecting section 21b of the branch section 21 of the exhaust device 5. In this preferred embodiment, the entrance 21a of the branch section 21 of the exhaust device 5 acts as the supply section 73 of the secondary air supply system 70. Also, the branch section 21 of the exhaust device 5 acts as a portion of the secondary air supply path 71 of the secondary air supply system 70. In Preferred Embodiment 2, the branch pipe 22 acts also as the secondary air supply pipe 72. Alternatively, the secondary air supply pipe 72 described in Preferred Embodiment 1 may be inserted to an intermediate portion of the branch pipe 22 from outside.

With the exhaust device 5 in this preferred embodiment, when the exhaust port 9a is opened, the lead valve 74 is closed. Thus, the shock wave can be reflected by the lead valve 74. When a negative pressure is generated in the exhaust path 16 by the action of the convergent-divergent nozzle 31, the lead valve 74 is opened and air can be supplied into the exhaust path 16 via the branch section 21. In this preferred embodiment also, a sufficient amount of air can be supplied into the exhaust path 16.

In this preferred embodiment, it is not necessary to provide a path acting exclusively as the branch section 21. Therefore, the exhaust device 5 in this preferred embodiment costs less than the exhaust device 5 using the exclusive branch section 21, for example, the exhaust device 5 in Preferred embodiment 1. In addition, the degree of freedom of layout can be improved.

Preferred Embodiment 3

Figure 12:
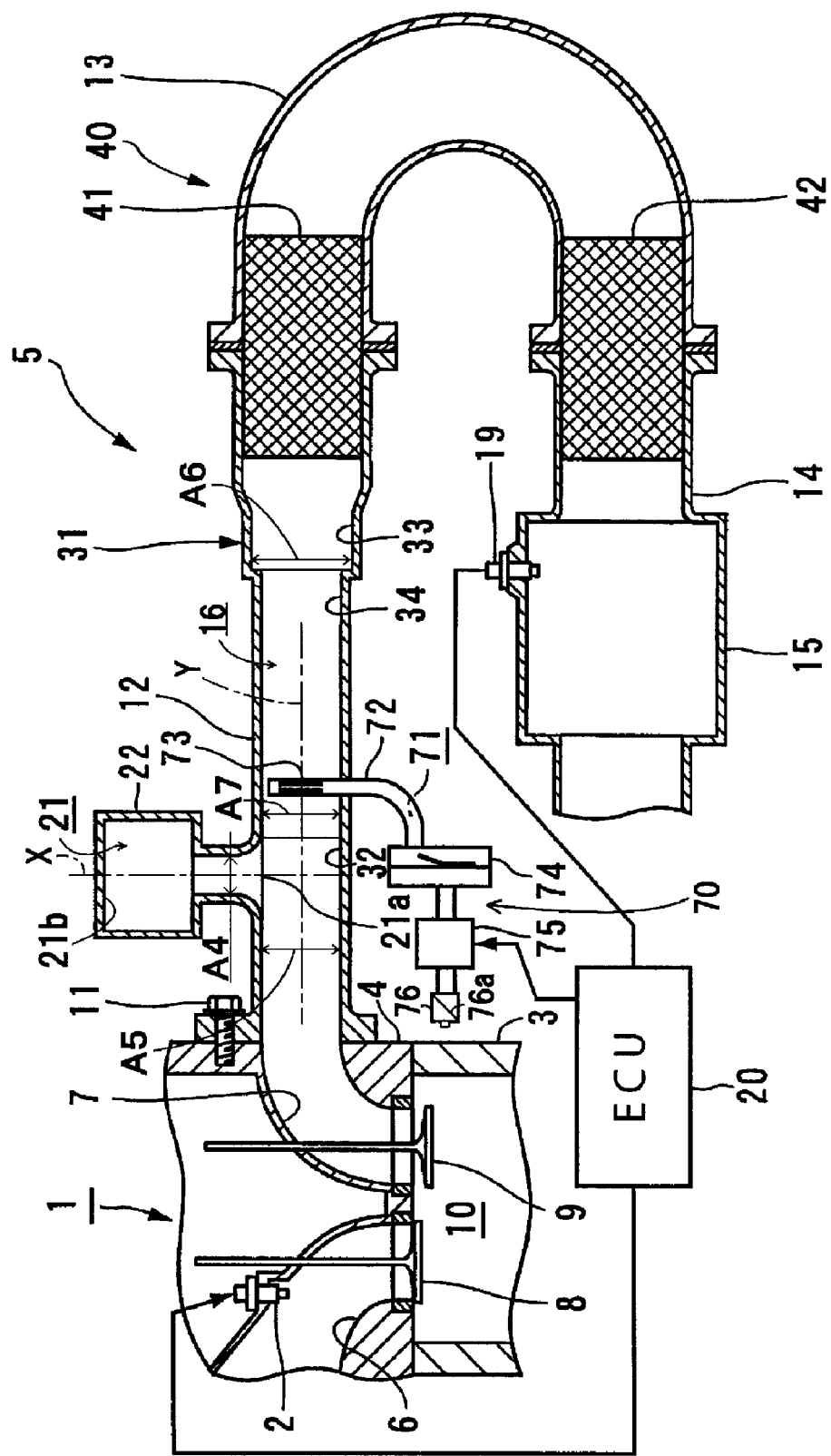
FIG. 12 shows a structure of an internal combustion engine according to Preferred Embodiment 3, and is a cross-sectional view of an exhaust path and the like thereof.

As shown in FIG. 12, in Preferred Embodiment 3, the branch pipe 22 is used as a portion of the convergent-divergent nozzle. Except for this structural difference, Preferred Embodiment 3 is preferably exactly the same as Preferred Embodiment 1. Accordingly, the detailed description of Preferred Embodiment 3 is provided by the detailed description of FIG. 1 through FIG. 10 relating to Preferred Embodiment 1. In Preferred Embodiments 1 and 2, the convergent section 32, the throat section 34 and the divergent section 33 are preferably provided in a portion of the exhaust path 16 which is downstream with respect to the branch section 21. However, as a result of continuing the active studies, the present inventors conceived of a structure providing the same effect with a simpler structure. According to a preferred embodiment of the present invention, in order to generate the progressing shock wave 35b, which is a new shock wave, a branch section 21 arranged to reflect and propagate the shock wave 35 back to the exhaust path 16 is provided. Considering this branch section 21 from a different point of view, the exhaust path 16 has the flow path cross-sectional area increased at the position of the branch section 21 and decreased downstream with respect to that position. In other words, the convergent section 32 and the throat section 34 are preferably provided in the exhaust path by the branch section 21. In the case where flow path cross-sectional area A5 of a portion of the exhaust path 16 which is upstream with respect to the entrance 21a of the branch section 21 is roughly the same as flow path cross-sectional area A7 of a portion of the exhaust path 16 which is downstream with respect to the entrance 21a of the branch section 21, there is the following relationship. As shown in FIG. 12, a sum of flow path cross-sectional area A5 of the portion of the exhaust path 16 which is upstream with respect to the entrance 21a of the branch section 21 and flow path cross-sectional area A4 of the branch section 21 is larger than flow path cross-sectional area A7 of the portion of the exhaust path 16 which is downstream with respect to the entrance 21a. Specifically, A4+A5>A7. Accordingly, it can be regarded that the convergent section 32 and the throat section 34 are arranged downstream with respect to the entrance 21a. Therefore, merely by providing the divergent section 33 downstream with respect to the entrance 21a, the convergent-divergent nozzle 31 can be substantially provided. A6 represents the flow path cross-sectional area of the divergent section 33, and A7<A6. A portion between the entrance 21a and the divergent section 33 is the throat section 34. The throat section 34 may be lengthy along the flow direction as shown here. The flow path cross-sectional area of the convergent section 32 and the divergent section 33 is not limited to be smoothly changing in the downstream direction, and may change step by step.

In Preferred Embodiments 1, 2 and 3, the internal combustion engine 1 supplies air to the exhaust path 16 as follows. The fuel is combusted in the combustion chamber 10. The exhaust valve 9 for opening or closing the exhaust port 9a of the combustion chamber 10 is opened to discharge the exhaust gas 36 to the exhaust path 16 from the combustion chamber 10. The shock wave 35 propagating in the exhaust path 16 at a higher velocity than the exhaust gas 36 is generated. At least a portion of the shock wave 35 is branched from the exhaust path 16, and the branched shock wave 35 is propagated back to the exhaust path 16 to cause the shock wave 35 to collide against the exhaust gas, thereby increasing the pressure of the exhaust gas. The flow path cross-sectional area of the exhaust path 16 is decreased to increase the pressure of the exhaust gas 36. Specifically, the pressure of the exhaust gas is increased by causing the exhaust gas to flow in a portion of the exhaust path 16 in which the flow path cross-sectional area is decreased in the downstream direction. In addition, the velocity of the exhaust gas 36 is increased by increasing the flow path cross-sectional area of the exhaust path 16. Specifically, the velocity of the exhaust gas is increased by causing the exhaust gas to flow in a portion of the exhaust path 16 in which the flow path cross-sectional area is increased in the downstream direction. The new shock wave 35b propagating in the downstream direction in the exhaust path 16 is generated to significantly decrease the temperature of the exhaust gas 36. The exhaust gas 36 is caused to pass the catalysts and is cleaned. Therefore, the cleaning efficiency can be improved with less deterioration of the catalysts.

Figure 13A:
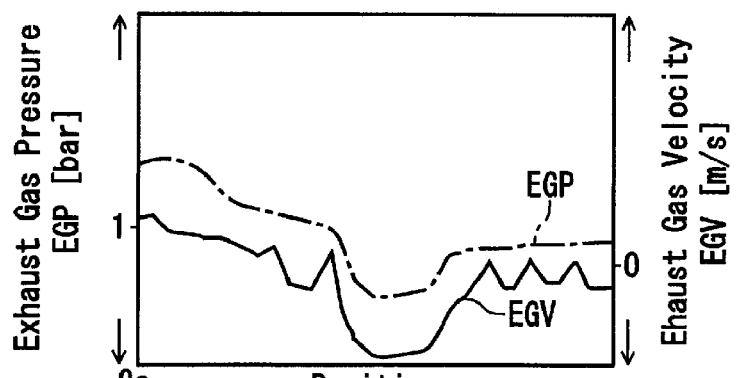
FIGS. 13A-13D show the relationship between the exhaust gas velocity and the exhaust gas pressure in the exhaust path in time sequence.
Figure 13B:
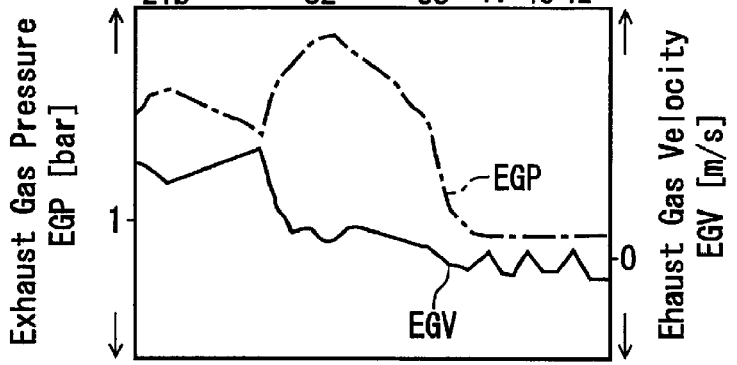
Figure 13C:
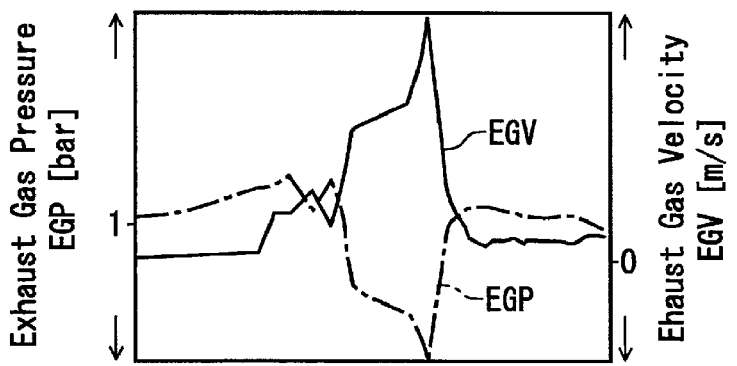
Figure 13D:
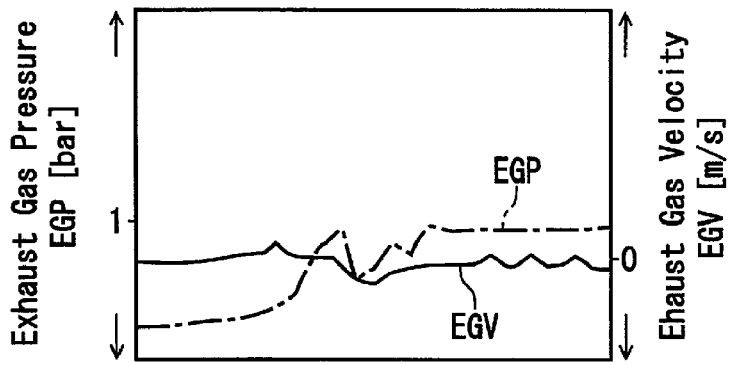
Figure 14A:
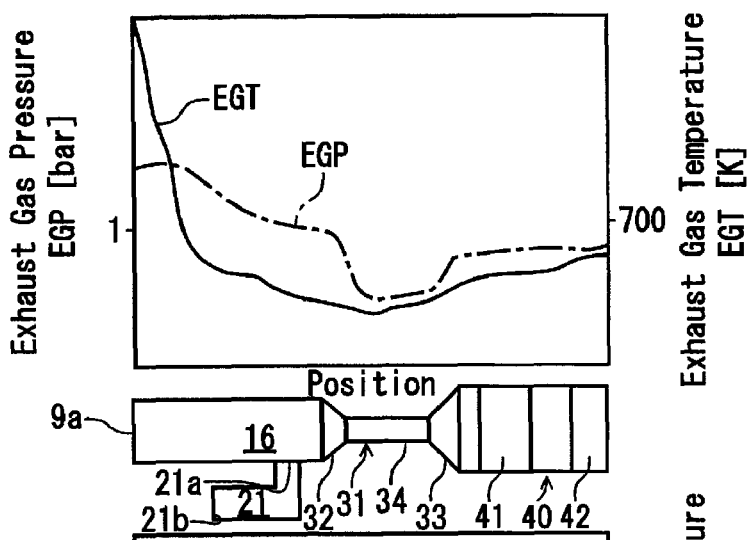
FIGS. 14A-14D show the relationship between the exhaust gas pressure and the exhaust gas temperature in the exhaust path in time sequence.
Figure 14B:
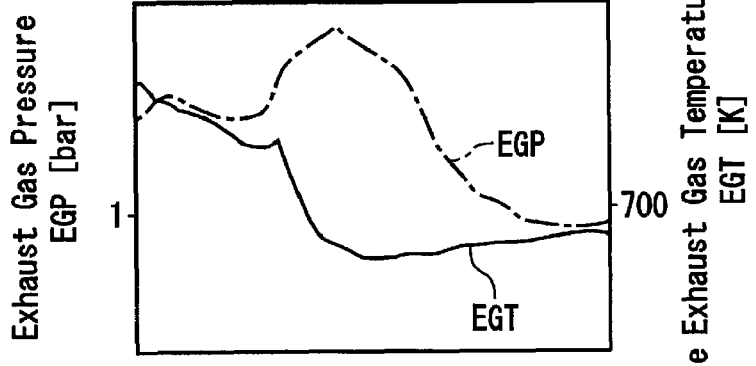
Figure 14C:
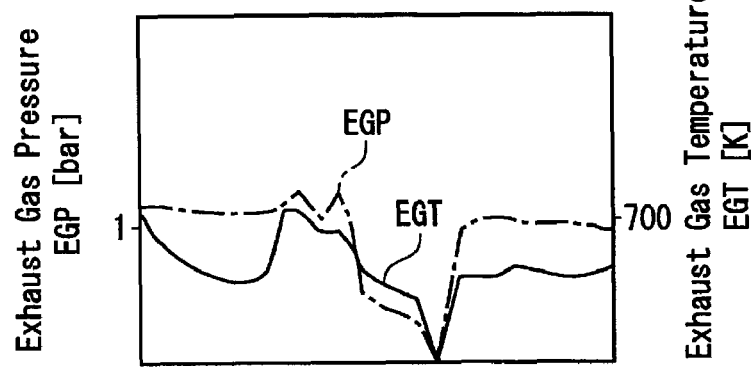
Figure 14D:
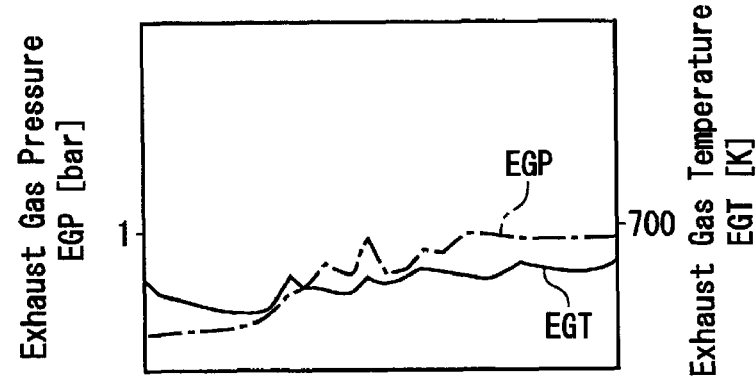

With reference to FIGS. 13A-13D and FIGS. 14A-14D, the exhaust gas cleaning method will be described in detail. FIGS. 13A-13D show the relationship between the exhaust gas velocity and the exhaust gas pressure in the exhaust path 16 in time sequence. FIGS. 14A-14D show the relationship between the exhaust gas pressure and the exhaust gas temperature in the exhaust path 16 in time sequence. The waveforms shown in FIG. 7 represent the relationship between the exhaust gas velocity and the exhaust gas pressure when the shock wave is being accelerated as shown in FIG. 13C. FIG. 13A and FIG. 14A show the respective relationship immediately after the exhaust port is opened. FIG. 13B and FIG. 14B show the respective relationship immediately after the exhaust gas and the shock wave collide against each other downstream with respect to the branch section 21. FIG. 13C and FIG. 14C show the respective relationship when the shock wave is being accelerated in the divergent section 33. FIG. 13D and FIG. 14D show the respective relationship after the shock wave is accelerated.

1) The fuel is combusted in the combustion chamber. By opening the exhaust port 9a in the combustion chamber, the exhaust gas 36 is discharged into the exhaust path 16 from the combustion chamber 10, and also the shock wave 35 propagating in the exhaust path 16 at a higher velocity than the exhaust gas 36 is generated. FIG. 13A shows the exhaust gas velocity and the exhaust gas pressure immediately after the exhaust port 9a is opened. As shown in FIG. 13A, when the exhaust port 9a is opened, the pressure of the exhaust gas in the vicinity of the exhaust port 9a becomes higher than the atmospheric pressure. FIG. 14A shows the exhaust gas pressure and the exhaust gas temperature immediately after the exhaust port 9a is opened. As shown in FIG. 14A, the temperature of the exhaust gas 36 becomes very high by receiving the combustion heat.

2) The branch section 21 branches at least a portion of the shock wave 35 propagating in the exhaust path 16, from the exhaust path 16. The reflecting section 21b of the branch section 21 reflects the branched shock wave 35. The reflected shock wave 35 propagates in the branch section 21 and again back to the exhaust path 16. The reflected shock wave 35 collides against the exhaust gas 36 flowing in the exhaust path 16, which increases the pressure of the exhaust gas. The flow path cross-sectional area of the exhaust path 16 is decreased in the convergent section 32, which increases the pressure of the exhaust gas. Either the increase of the exhaust gas pressure caused by the collision of the shock wave 35 and the exhaust gas 36, or the increase of the exhaust gas pressure caused by the decrease of the flow path cross-sectional area, may occur first. Specifically, the collision of the shock wave 35 and the exhaust gas 36 may occur before or after the exhaust gas pressure is increased in the convergent section 32. FIG. 13B shows the exhaust gas velocity and the exhaust gas pressure immediately after the exhaust gas pressure is increased. As shown in FIG. 13B, in the vicinity of the convergent section 32, the exhaust gas pressure is higher than that at the time of FIG. 13A. Upstream with respect to the convergent section 32, the exhaust gas velocity is higher than that at the time of FIG. 13A. FIG. 14B shows the exhaust gas pressure and the exhaust gas temperature immediately after the exhaust gas pressure is increased. As shown in FIG. 14B, the exhaust gas temperature is lower in the vicinity of the exhaust port 9a, but is higher upstream with respect to the convergent section 32, than that at the time of FIG. 14A.

3) When the flow path cross-sectional area of the exhaust path 16 is increased in the divergent section 33 to increase the exhaust gas velocity, a new shock wave 35b propagating in the downstream direction in the exhaust path 16 is generated. When the shock wave 35b is generated, an expansion wave 35c progressing in the upstream direction is generated at the same time. The new shock wave 35b is accelerated in the divergent section 33. Therefore, the fluid present in the space between the shock wave 35b progressing in the downstream direction in the exhaust path 16 and the expansion wave 35c progressing in the upstream direction in the exhaust path 16 expands rapidly. This can decrease the pressure of the exhaust gas flowing in the exhaust path 16. Thus, a region of a negative pressure can be generated in the exhaust path 16. At this point, the exhaust gas temperature can be decreased upstream with respect to the shock wave 35b by an adiabatic cooling effect caused by adiabatic expansion. FIG. 13C shows the exhaust gas velocity and the exhaust gas pressure when the shock wave 35b is being accelerated in the divergent section 33. As shown in FIG. 13C, the exhaust gas pressure is rapidly decreased from that at the time of FIG. 13B upstream with respect to the divergent section 33, to become a negative pressure. In accompaniment with this, the exhaust gas velocity upstream with respect to the divergent section 33 is rapidly increased. FIG. 14C shows the exhaust gas pressure and the exhaust gas temperature when the shock wave 35b is being accelerated in the divergent section 33. As shown in FIG. 14C, in accompaniment with the decrease of the exhaust gas pressure upstream with respect to the divergent section 33, the exhaust gas temperature is rapidly decreased from that at the time of FIG. 14B.

FIG. 13D shows the exhaust gas velocity and the exhaust gas pressure after the shock wave 35b is accelerated. As shown in FIG. 13D, the influence of the exhaust gas pressure, which is decreased upstream with respect to the divergent section 33 at the time of FIG. 13C, is exerted even on the exhaust port 9a upstream with respect to the convergent section 32. Therefore, the exhaust gas pressure becomes a negative pressure also in the vicinity of the exhaust port 9a. FIG. 14D shows the exhaust gas pressure and the exhaust gas temperature after the shock wave 35b is accelerated. As shown in FIG. 14D, since the exhaust gas pressure becomes a negative pressure also in the vicinity of the exhaust port 9a, the exhaust gas temperature can also be significantly decreased in the vicinity of the exhaust port.

As shown in FIGS. 14A-14D, the exhaust gas temperature downstream with respect to the divergent section 33 does not change much. In other words, since the exhaust gas of a high temperature in the vicinity of the exhaust port 9a shown in FIG. 14A is cooled by an adiabatic cooling effect in the divergent section 33, the exhaust gas temperature downstream with respect to the divergent section 33 can be prevented from being changed.

In the example shown in FIGS. 13A-13D and FIGS. 14A-14D, the first catalyst 41 and the second catalyst 42 are provided downstream with respect to the divergent section 33. Since the exhaust gas temperature downstream with respect to the divergent section 33 can be prevented from being changed as described above, the temperature of the exhaust gas passing the first catalyst 41 and the second catalyst can be prevented from becoming excessively high. This can prevent sintering of the catalysts even where the internal combustion engine 1 is driven at a high load or in a high rotational speed range.

Where the secondary air supply pipe 72 arranged to supply air to a region in which a negative pressure is generated is connected, the air can be supplied to the exhaust path 16. Specifically, as shown in FIG. 13C and FIG. 13D, after the shock wave 35b is accelerated, a negative pressure region is generated upstream with respect to the divergent section 33. Therefore, by providing the supply section 73 of the secondary air supply path 71 upstream with respect to the divergent section 33, a large amount of air can be supplied to the exhaust path 16.

Other Preferred Embodiments

Figure 15:
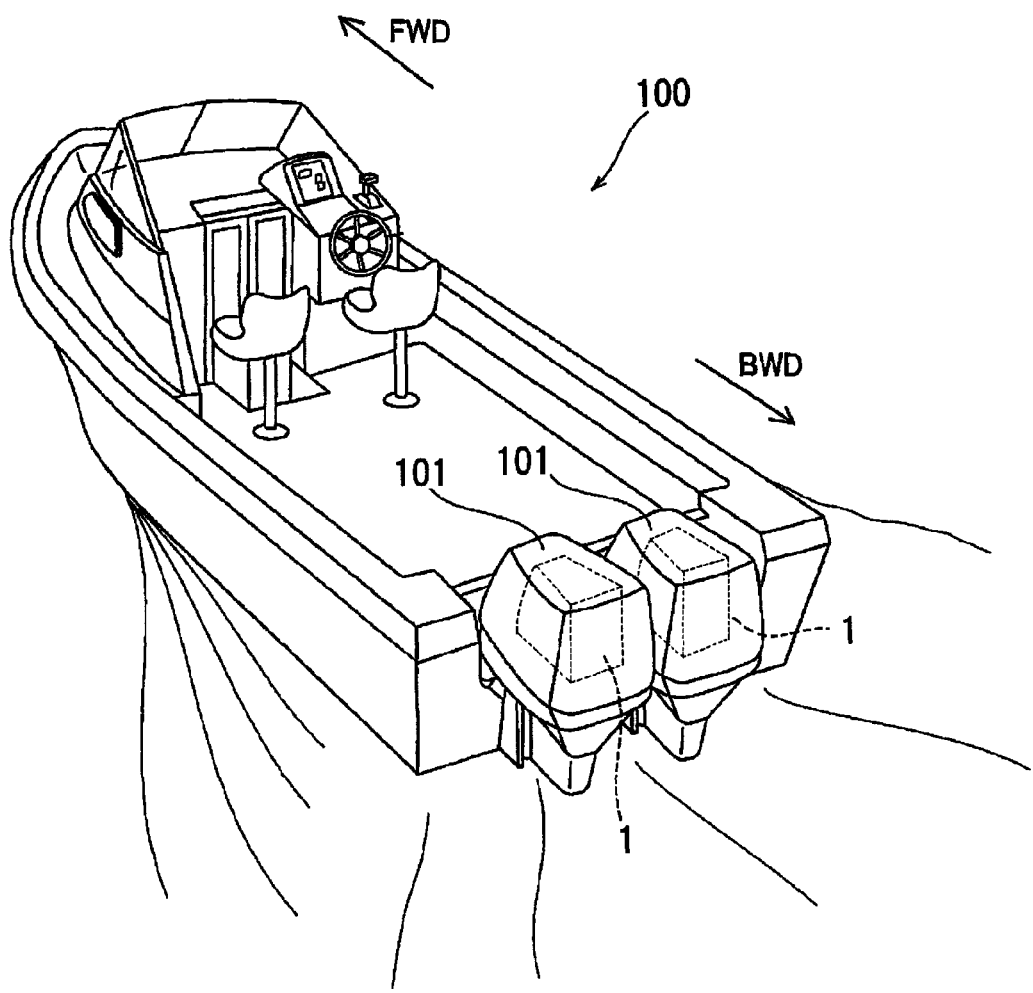
FIG. 15 shows a marine vessel having an internal combustion engine according to a preferred embodiment of the present invention mounted thereon.
Figure 16:
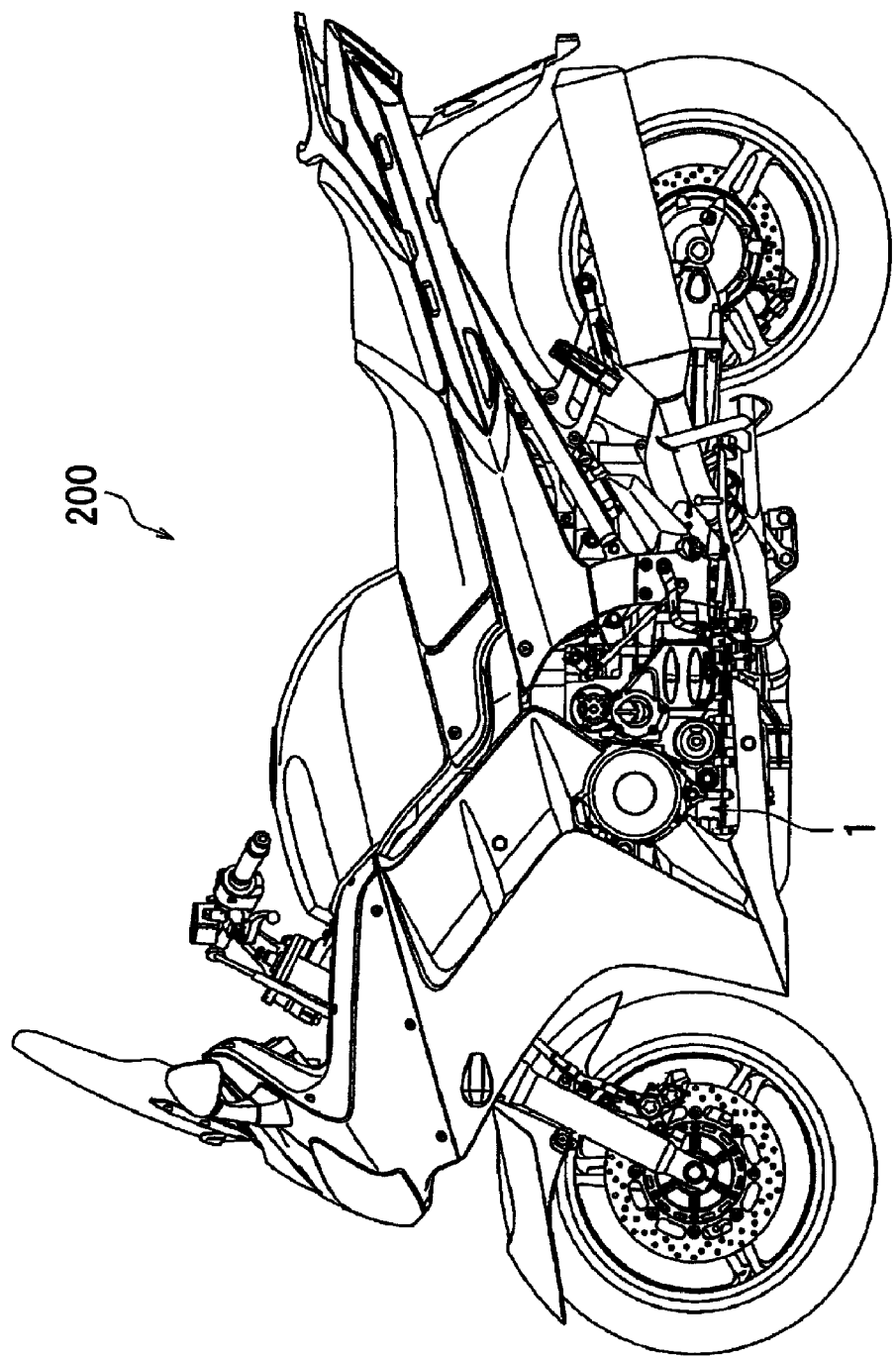
FIG. 16 shows a vehicle having an internal combustion engine according to a preferred embodiment of the present invention mounted thereon.

FIG. 15 shows a marine vessel including an internal combustion engine according to a preferred embodiment of the present invention mounted thereon. Specifically, FIG. 15 shows a marine vessel 100 preferably including two outboard motors 101 each including an internal combustion engine 1 according to a preferred embodiment of the present invention mounted thereon. FIG. 16 shows a vehicle including an internal combustion engine according to a preferred embodiment of the present invention mounted thereon. Specifically, FIG. 16 shows a motorcycle 200 including an internal combustion engine 1 located at the center of the body thereof. There is no limitation on the applications of the internal combustion engine according to preferred embodiments of the present invention.

Figure 17:
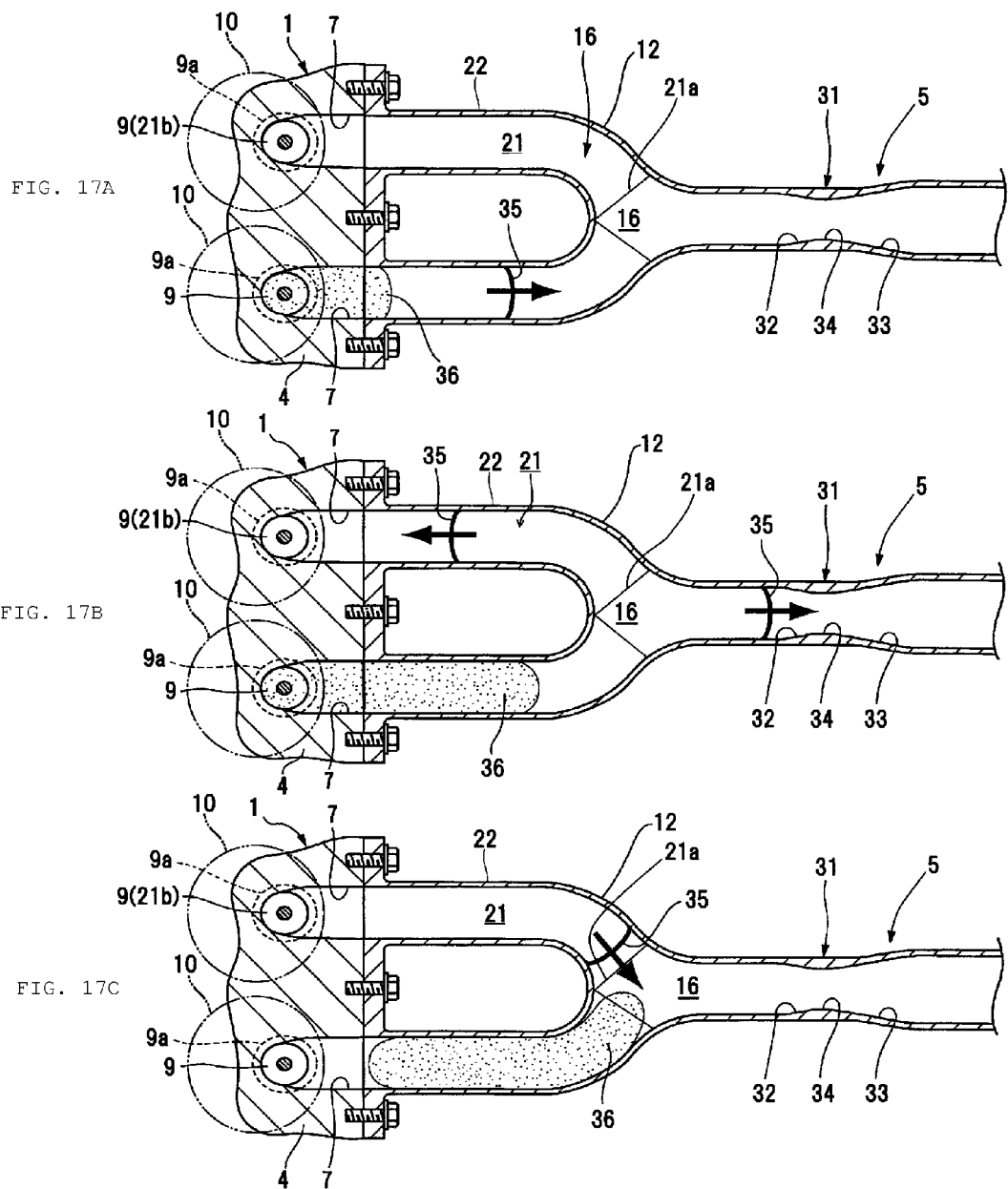
FIGS. 17A-17C are cross-sectional views of a multi-cylinder internal combustion engine to which a preferred embodiment of the present invention is applied, and provides cross-sectional views of an exhaust path and the like showing the progress of a shock wave and exhaust gas like FIGS. 4A-4C.

FIGS. 17A-17C shows a multi-cylinder engine in which the exhaust ports 9a of a plurality of combustion chambers 10 are merged together by an exhaust path and a convergent-divergent nozzle 31 is provided downstream with respect to the merging portion. In this preferred embodiment, a portion of the exhaust path connected to one of the ports 9a preferably defines a branch section 21. The detailed description of FIGS. 17A-17C is the same as that of FIGS. 4A-4C. Thus, it is easily understood that various preferred embodiments of the present invention are applicable to a multi-cylinder engine as shown in FIGS. 17A-17C.

In the above preferred embodiments, one exhaust port is preferably provided for one combustion chamber, for example. Alternatively, a plurality of exhaust ports may be provided for one combustion chamber, for example. In the above preferred embodiments, one convergent-divergent nozzle is preferably provided for one combustion chamber, for example. Alternatively, two or more nozzles may be provided for one combustion chamber, for example. Needless to say, such structures are applicable to a multi-cylinder internal combustion engine having a plurality of combustion chambers. Preferred embodiments of the present invention are applicable to any of various types of internal combustion engines.

In the above preferred embodiments, one branch section is preferably provided for one exhaust path, for example. Alternatively, a plurality of branch sections may be provided for one exhaust path, for example. Still alternatively, ends of a plurality of branch sections branched from one, same position of the exhaust path 16 may be connected together to define a branch section having a cyclic path. In this case, the shock waves which have propagated in the respective branch sections collide against one another and are reflected at the connection portion. The connection portion acts as the reflecting section. The reflecting section can be provided even without a member such as a wall.

Figure 18:
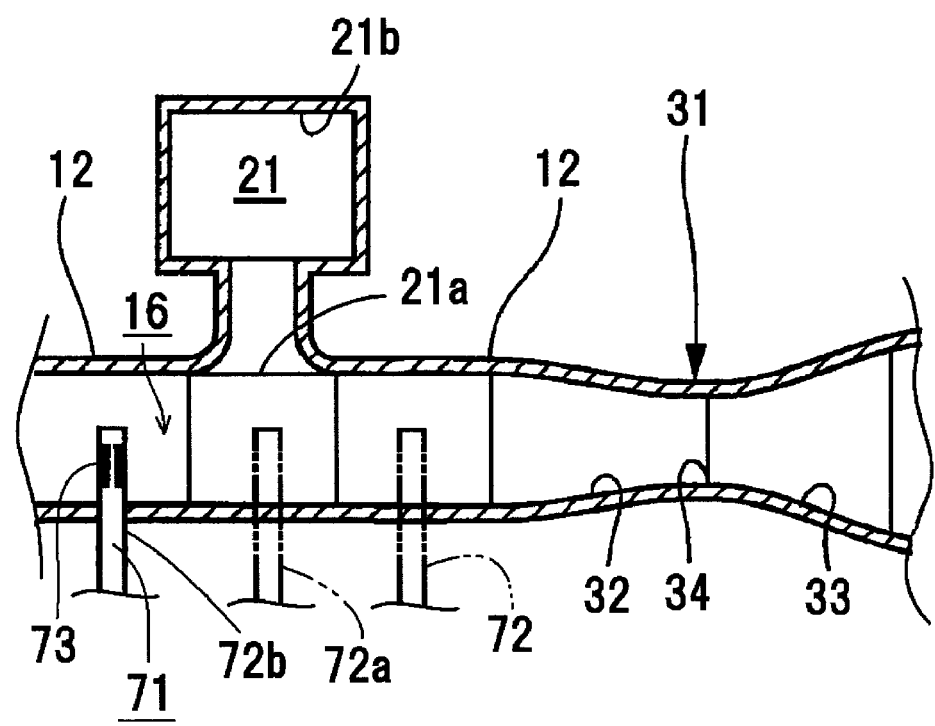
FIG. 18 shows a modification of one of the above preferred embodiments, and is a cross-sectional view of an exhaust path and the like thereof.

FIG. 18 shows a modification of one of the above preferred embodiments, and is a cross-sectional view of an exhaust path and the like thereof. In Preferred Embodiment 1, as shown again in FIG. 18, the secondary air supply pipe 72, namely, the supply section 73 of the secondary air supply path 71 is preferably arranged downstream with respect to the branch section 21. Alternatively, in a modification, the secondary air supply pipe 72, namely, the supply section 73 of the secondary air supply path 71 may be arranged upstream with respect to the branch section 21 (see reference numeral 72b) or at the same position as the branch section 21 (see reference numeral 72a).

According to various preferred embodiment of the present invention, the exhaust device 5 includes an exhaust path including a flow path cross-sectional area which does not decrease between the downstream end of the divergent section 33 and an upstream end of the catalyst 41 of the exhaust cleaning device 40. Therefore, the exhaust gas is not compressed, and so the temperature of the exhaust gas can be prevented from increasing.

According to various preferred embodiment of the present invention, the exhaust cleaning device 40 includes the catalyst 41 including a flow path cross-sectional area which is, at the upstream end thereof, the same as, or larger than, the flow path cross-sectional area at the downstream end of the divergent section 33. The flow path cross-sectional area of the catalyst 41 is the flow path cross-sectional area of the catalyst 41 excluding a carrier thereof, in other words, is a cross-sectional area of the effective opening of the main body of the catalyst, through which the exhaust gas can pass. As a result of this structure, the exhaust gas is not compressed when passing the catalyst 41 and so the temperature of the exhaust gas can further be suppressed from increasing. Also as a result of this structure, the exhaust device 5 and the exhaust cleaning device 40 can be prevented from increasing in size, and a catalyst having a large flow path cross-sectional area can be provided to improve the cleaning efficiency.

According to a preferred embodiment of the present invention, the exhaust cleaning device 40 includes the catalyst 41 having a flow path cross-sectional area which is, at the upstream end thereof, the same as, or larger than, the flow path cross-sectional area at the downstream end of the divergent section 33. The exhaust device 5 includes the exhaust path 16 having a flow path cross-sectional area which is kept the same or increases between the downstream end of the divergent section 33 and the upstream end of the catalyst 41. As a result of this structure, the exhaust device 5 and the exhaust cleaning device 40 can be prevented from increasing in size, and a catalyst including a large flow path cross-sectional area can be provided to improve the cleaning efficiency. In addition, the exhaust gas is not compressed, and so the temperature of the exhaust gas can be suppressed from increasing.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:
1. An internal combustion engine comprising:
a combustion chamber including an exhaust port;
an exhaust valve arranged to open or close the exhaust port;
an exhaust device including an exhaust path arranged to guide exhaust gas discharged from the combustion chamber via the exhaust port; and an exhaust cleaning device provided in the exhaust path and including a catalyst; wherein the exhaust device includes:
- a convergent section including a flow path cross-sectional area that is smaller at a downstream end thereof than at an upstream end thereof;
- a divergent section provided downstream with respect to the convergent section and including a flow path cross-sectional area that is larger at a downstream end thereof than at an upstream end thereof; and
- a branch section arranged to branch a shock wave generated by the exhaust gas discharged from the combustion chamber and propagating in a downstream direction in the exhaust path at a higher velocity than the exhaust gas that generated the shock wave and is flowing into the exhaust path from the combustion chamber when the exhaust port is opened, from a portion of the exhaust path which is upstream with respect to the divergent section, and to propagate the shock wave back to the exhaust path;

the exhaust path is arranged to cause the exhaust gas that generated the shock wave and is flowing into the exhaust path from the combustion chamber to pass the convergent section and to collide against the shock wave, which has propagated in the branch section, between the branch section and the divergent section, so as to increase the pressure of the exhaust gas in the convergent section;

the exhaust gas is caused to pass the divergent section to generate a new shock wave and thus to decrease the temperature of the exhaust gas; and the catalyst of the exhaust cleaning device is provided in a portion of the exhaust path which is downstream with respect to the divergent section.

2. An internal combustion engine comprising:
a combustion chamber including an exhaust port;
an exhaust valve arranged to open or close the exhaust port;
an exhaust device including an exhaust path arranged to guide exhaust gas discharged from the combustion chamber via the exhaust port; and
an exhaust cleaning device provided in the exhaust path and including a catalyst; wherein the exhaust device includes:
- a convergent section including a flow path cross-sectional area that is smaller at a downstream end thereof than at an upstream end thereof;
- a divergent section provided downstream with respect to the convergent section and including a flow path cross-sectional area that is larger at a downstream end thereof than at an upstream end thereof; and
- a branch section arranged to branch a shock wave generated by the exhaust gas discharged from the combustion chamber and is propagating in a downstream direction in the exhaust path at a higher velocity than the exhaust gas that generated the shock-wave and is flowing into the exhaust path from the combustion chamber when the exhaust port is opened, from a portion of the exhaust path which is upstream with respect to the divergent section, and to propagate the shock wave back to the exhaust path;

the catalyst of the exhaust cleaning device is provided in a portion of the exhaust path which is downstream with respect to the divergent section;

where a velocity of the exhaust gas discharged from the combustion chamber when the exhaust port is opened is Ve and a propagation velocity of the shock wave propagating in the exhaust path is Vs, a distance Le between the exhaust port and an entrance of the branch section and a distance Ls by which the shock wave propagates in the branch section fulfill a relationship of:

$$Le/Ve \leq (Le+2Ls)/Vs; \text{ and}$$

where a time from when the exhaust port is opened until the exhaust port is closed is tv, a distance Ld between the entrance of the branch section and the divergent section fulfills the relationship of:

$$(Le+2Ls+Ld)/Vs \leq tv+(Le+Ld)/Ve.$$

3. The internal combustion engine according to claim 1, wherein the exhaust device includes the exhaust path including a flow path cross-sectional area which does not decrease between the downstream end of the divergent section and an upstream end of the catalyst.

4. The internal combustion engine according to claim 1, wherein the exhaust cleaning device includes the catalyst including a flow path cross-sectional area which is, at the upstream end thereof, the same as, or larger than, the flow path cross-sectional area of the downstream end of the divergent section.

5. The internal combustion engine according to claim 1, wherein the exhaust cleaning device includes the catalyst including a flow path cross-sectional area which is, at the upstream end thereof, the same as, or larger than, the flow path cross-sectional area of the downstream end of the divergent section; and the exhaust device includes the exhaust path including a flow path cross-sectional area which is kept the same or increases between the downstream end of the divergent section and the upstream end of the catalyst.

6. A vehicle comprising the internal combustion engine according to claim 1.

7. A vehicle comprising the internal combustion engine according to claim 3.

8. A vehicle comprising the internal combustion engine according to claim 4.

9. A vehicle comprising the internal combustion engine according to claim 1.

10. A marine vessel comprising the internal combustion engine according to claim 1.

11. A marine vessel comprising the internal combustion engine according to claim 3.

12. A marine vessel comprising the internal combustion engine according to claim 4.

13. A marine vessel comprising the internal combustion engine according to claim 5.

14. An exhaust gas cleaning method for an internal combustion engine, the method comprising the steps of:
combusting fuel in a combustion chamber;
opening an exhaust valve arranged to open or close an exhaust port of the combustion chamber to discharge exhaust gas from the combustion chamber to an exhaust path and to generate a shock wave propagating in the exhaust path at a higher velocity than the exhaust gas;
branching at least a portion of the shock wave from the exhaust path and propagating the branched shock wave back to the exhaust path to cause the shock wave to collide against the exhaust gas that generated the shock wave, so as to increase the pressure of the exhaust gas;
causing the exhaust gas to flow into a portion of the exhaust path including a smaller flow path cross-sectional area in a downstream section thereof than in an upstream section thereof, so as to increase the pressure of the exhaust gas;

causing the exhaust gas to flow into a portion of the exhaust path having a larger flow path cross-sectional area in a downstream section thereof than in an upstream section thereof, thereby generating a new shock wave propagating in a downstream direction in the exhaust path and thus decreasing the temperature of the exhaust gas; and causing the exhaust gas to pass a catalyst to clean the exhaust gas.

15. A method of operating an internal combustion engine, the method comprising the steps of:

operating the internal combustion engine;

combusting fuel in a combustion chamber;

opening an exhaust valve arranged to open or close an exhaust port of the combustion chamber to discharge exhaust gas from the combustion chamber to an exhaust path and to generate a shock wave propagating in the exhaust path at a higher velocity than the exhaust gas;

branching at least a portion of the shock wave from the exhaust path and propagating the branched shock wave back to the exhaust path to cause the shock wave to collide against the exhaust gas that generated the shock wave, so as to increase the pressure of the exhaust gas;

causing the exhaust gas to flow into a portion of the exhaust path including a smaller flow path cross-sectional area in a downstream section thereof than in an upstream section thereof, so as to increase the pressure of the exhaust gas;

causing the exhaust gas to flow into a portion of the exhaust path having a larger flow path cross-sectional area in a downstream section thereof than in an upstream section thereof, thereby generating a new shock wave propagating in a downstream direction in the exhaust path and thus decreasing the temperature of the exhaust gas; and causing the exhaust gas to pass a catalyst to clean the exhaust gas.

16. The internal combustion engine according to claim 1, wherein the convergent section and the divergent nozzle satisfy the conditions represented by Expressions (1) and (2) below:

Expression 1

$$\frac{dM}{dx} = \frac{\Lambda}{1-M^2} \quad (1)$$

Expression 2

$$\Lambda \equiv M\left[1 + \frac{\gamma-1}{2}M^2\right]\left[\frac{\gamma M^2}{2}\left(\frac{4f}{D}\right) - \frac{1}{A}\frac{dA}{dx}\right] \quad (2)$$

wherein

Expression (1) represents a relationship between a shape of the exhaust pipe and a Mach number in a primary flow accompanied by viscous friction;

Expression (2) represents $\Lambda$ in Expression (1); and

M represents the Mach number, A represents a cross-sectional area of the exhaust pipe at an arbitrary cross-section, D represents a diameter of the exhaust pipe at the arbitrary cross-section, $\gamma$ represents a specific heat ratio, x represents a distance in a flow direction, and f represents a frictional coefficient.

17. The internal combustion engine according to claim 2, wherein the convergent section and the divergent nozzle satisfy the conditions represented by Expressions (1) and (2) below:

Expression 1

$$\frac{dM}{dx} = \frac{\Lambda}{1-M^2} \quad (1)$$

Expression 2

$$\Lambda \equiv M\left[1 + \frac{\gamma-1}{2}M^2\right]\left[\frac{\gamma M^2}{2}\left(\frac{4f}{D}\right) - \frac{1}{A}\frac{dA}{dx}\right] \quad (2)$$

wherein

Expression (1) represents a relationship between a shape of the exhaust pipe and a Mach number in a primary flow accompanied by viscous friction;

Expression (2) represents $\Lambda$ in Expression (1); and

M represents the Mach number, A represents a cross-sectional area of the exhaust pipe at an arbitrary cross-section, D represents a diameter of the exhaust pipe at the arbitrary cross-section, $\gamma$ represents a specific heat ratio, x represents a distance in a flow direction, and f represents a frictional coefficient.

\* \* \* \* \*